(12) United States Patent
Su et al.

(10) Patent No.: US 11,651,906 B2
(45) Date of Patent: May 16, 2023

(54) VOLTAGE-MODIFIED HYBRID ELECTROCHEMICAL CELL DESIGN

(71) Applicant: GM GLOBAL TECHNOLOGY OPERATIONS LLC, Detroit, MI (US)

(72) Inventors: Qili Su, Shanghai (CN); Haijing Liu, Shanghai (CN); Meiyuan Wu, Shanghai (CN); Dewen Kong, Shanghai (CN); Mengyan Hou, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 420 days.

(21) Appl. No.: 17/069,932

(22) Filed: Oct. 14, 2020

(65) Prior Publication Data

US 2021/0110980 A1 Apr. 15, 2021

(30) Foreign Application Priority Data

Oct. 15, 2019 (CN) .......................... 201910978022.8

(51) Int. Cl.
*H01G 11/08* (2013.01)
*H01G 11/32* (2013.01)
(Continued)

(52) U.S. Cl.
CPC ............ *H01G 11/08* (2013.01); *H01G 11/04* (2013.01); *H01G 11/32* (2013.01); *H01G 11/46* (2013.01)

(58) Field of Classification Search
None
See application file for complete search history.

(56) References Cited

U.S. PATENT DOCUMENTS

| 10,297,885 B2 | 5/2019 | Gayden et al. |
| 2014/0170457 A1* | 6/2014 | Wegner .............. H01M 4/5815 564/441 |

(Continued)

FOREIGN PATENT DOCUMENTS

| WO | 2018132992 A1 | 7/2018 |
| WO | 2019200609 A1 | 10/2019 |

(Continued)

OTHER PUBLICATIONS

Halalay, Ion C. et al., U.S. Appl. No. 16/160,799, filed Oct. 15, 2018 entitled, "Method for Making Silicon-Containing Composite Electrodes for Lithium-Based Batteries," 47 pages.

(Continued)

*Primary Examiner* — Dion R. Ferguson
(74) *Attorney, Agent, or Firm* — Harness, Dickey & Pierce, P.L.C.

(57) ABSTRACT

Hybrid lithium-ion electrochemical cells include a first electrode having a first polarity and a first electroactive material that reversibly cycles lithium ions having a first maximum operational voltage and a second electrode having the first polarity with a second electroactive material having a second maximum operational voltage. A difference between the second and first maximum operational voltages defines a predetermined voltage difference. Also included are at least one third electrode including a third electroactive material that reversibly cycles lithium ions having a second polarity opposite to the first polarity, a separator, and electrolyte. A voltage modification component (e.g., diode) is in electrical communication with the first and the second electrodes. In a first operational state corresponding to charging, the at least one voltage modification component is configured to induce a voltage drop corresponding to the predetermined voltage difference providing high power den- (Continued)

sity and high energy density hybrid lithium-ion electrochemical cells.

20 Claims, 8 Drawing Sheets

(51) Int. Cl.
*H01G 11/46* (2013.01)
*H01G 11/04* (2013.01)

(56) References Cited

U.S. PATENT DOCUMENTS

| | | |
|---|---|---|
| 2018/0034094 A1 | 2/2018 | Liu et al. |
| 2018/0287164 A1 | 10/2018 | Liu et al. |
| 2019/0061555 A1 | 2/2019 | Liu et al. |
| 2019/0067754 A1 | 2/2019 | Gu et al. |
| 2019/0074510 A1 | 3/2019 | Zhang et al. |
| 2019/0157659 A1 | 5/2019 | Liu et al. |
| 2019/0190012 A1 | 6/2019 | Wu et al. |
| 2019/0341648 A1 | 11/2019 | Wu et al. |
| 2019/0372127 A1 | 12/2019 | Li et al. |
| 2019/0372186 A1 | 12/2019 | Kong et al. |
| 2019/0393569 A1 | 12/2019 | Rich et al. |
| 2020/0036053 A1 | 1/2020 | Li et al. |
| 2020/0036070 A1 | 1/2020 | Li et al. |

FOREIGN PATENT DOCUMENTS

| | | |
|---|---|---|
| WO | 2019204964 A1 | 10/2019 |
| WO | 2019218327 A1 | 11/2019 |

OTHER PUBLICATIONS

Lu, Yong et al., U.S. Appl. No. 16/661,364, filed Oct. 23, 2019 entitled, "Electrochemical Cells Including Sulfur-Containing Capacitors," 61 pages.

Kong, Dewen et al., U.S. Appl. No. 16/685,389, filed Nov. 15, 2019 entitled, "Capacitor-Assisted Gradient Electrodes," 71 pages.

* cited by examiner

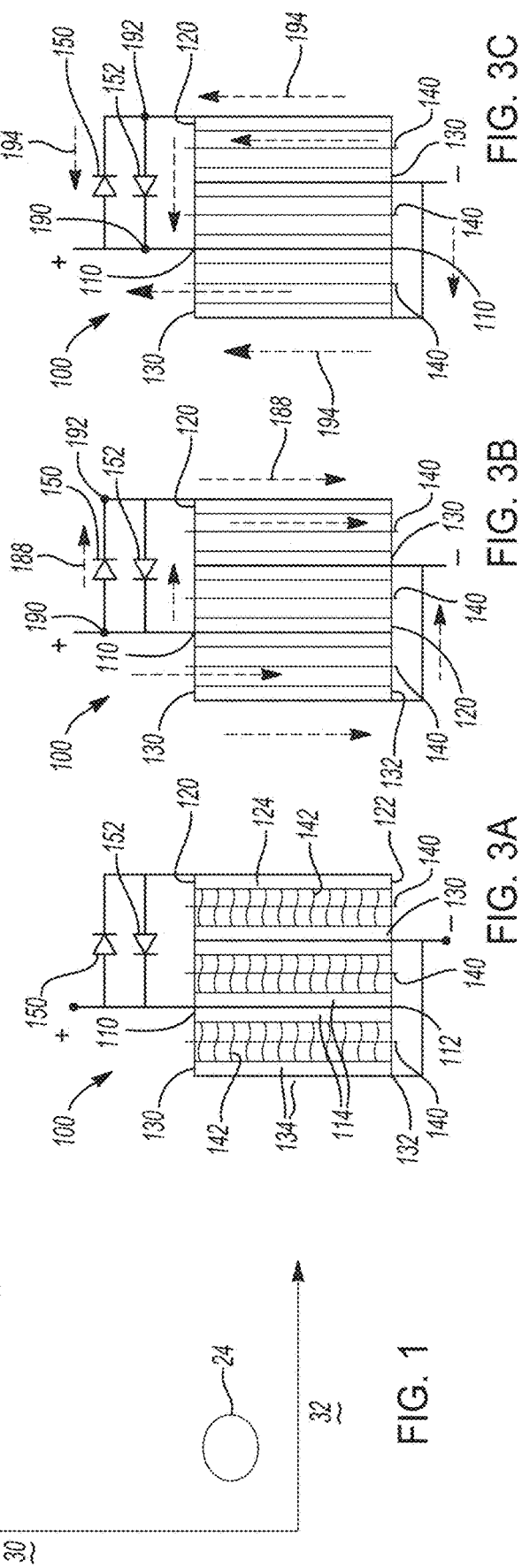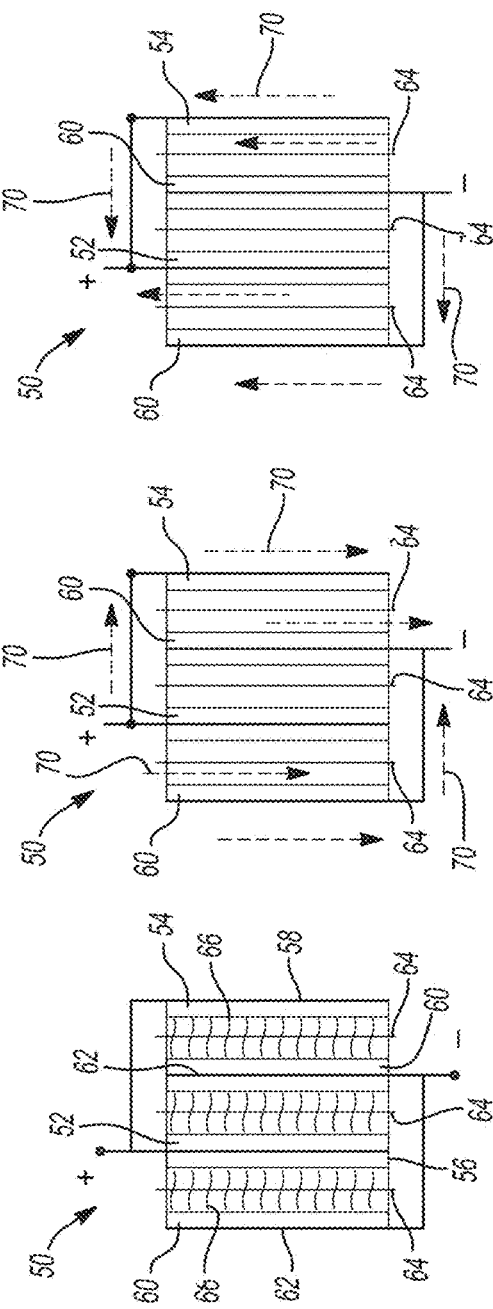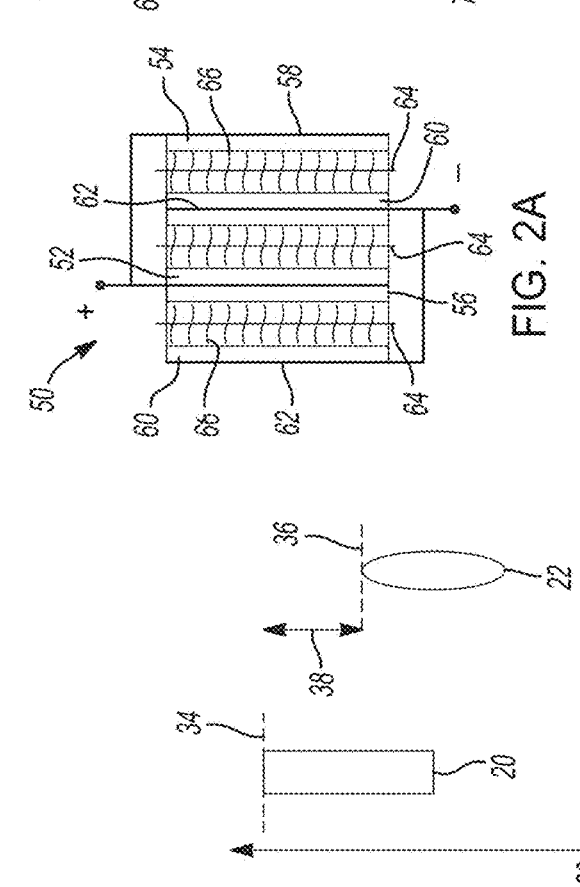

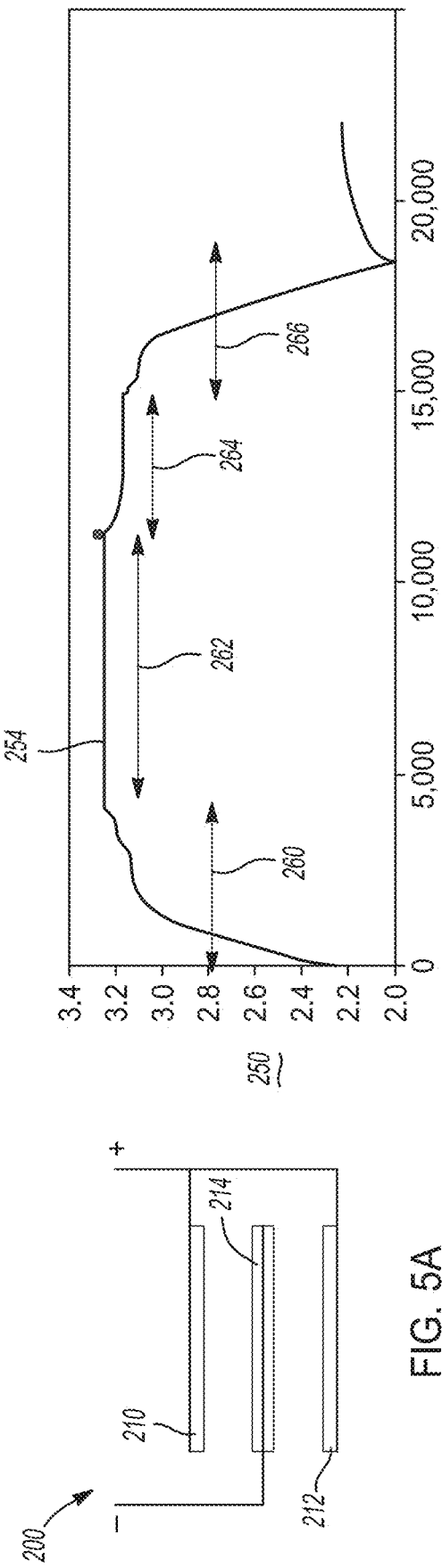
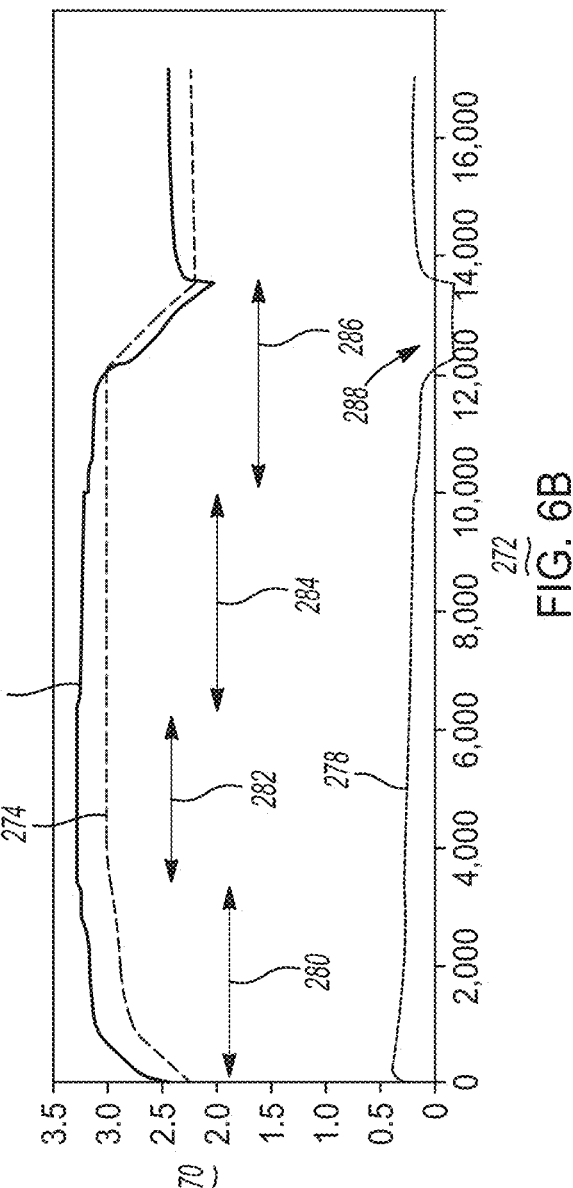
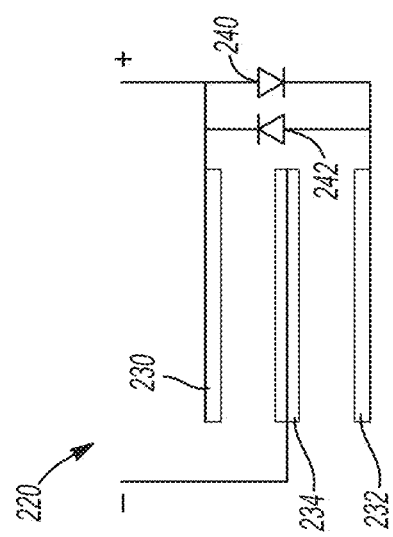
FIG. 5A
FIG. 5B
FIG. 6A
FIG. 6B

VOLTAGE-MODIFIED HYBRID ELECTROCHEMICAL CELL DESIGN

CROSS-REFERENCE TO RELATED APPLICATIONS

This application claims the benefit and priority of Chinese Patent Application No. 201910978022.8, filed Oct. 15, 2019. The entire disclosure of the above application is incorporated herein by reference.

INTRODUCTION

This section provides background information related to the present disclosure which is not necessarily prior art.

The present disclosure relates to hybrid lithium-ion electrochemical cells having high-energy capacity and high power capacity. Hybrid lithium-ion electrochemical cells include a first electrode having a first polarity and a first electroactive material that reversibly cycles lithium ions and a second electrode having the first polarity with a second electroactive material distinct from the first electroactive material. In certain circumstances, where electrodes have distinct electroactive materials, they may be limited in operation by a predetermined voltage difference. A voltage modification component (e.g., diode) is in electrical communication with the first and the second electrodes and provides a voltage drop corresponding to the predetermined voltage difference between the first electrode and second electrode.

High-energy density electrochemical cells, such as lithium-ion batteries can be used in a variety of consumer products and vehicles, such as hybrid or electric vehicles. Typical lithium-ion batteries comprise at least one positive electrode or cathode, at least one negative electrode or an anode, an electrolyte material, and a separator. A stack of lithium-ion battery cells may be electrically connected in an electrochemical device to increase overall output. Lithium-ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

The potential difference or voltage of a battery cell is determined by differences in chemical potentials (e.g., Fermi energy levels) between the electrodes. Under normal operating conditions, the potential difference between the electrodes achieves a maximum achievable value when the battery cell is fully charged and a minimum achievable value when the battery cell is fully discharged. The battery cell will discharge and the minimum achievable value will be obtained when the electrodes are connected to a load performing the desired function (e.g., electric motor) via an external circuit. Each of the negative and positive electrodes in the battery cell is connected to a current collector (typically a metal, such as copper for the anode and aluminum for the cathode). The current collectors associated with the two electrodes are connected by an external circuit that allows current generated by electrons to pass between the electrodes to compensate for transport of lithium ions across the battery cell. For example, during cell discharge, the internal Li' ionic current from the negative electrode to the positive electrode may be compensated by the electronic current flowing through the external circuit from the negative electrode to the positive electrode of the battery cell.

Many different materials may be used to create components for a lithium ion battery. For example, positive electrode materials for lithium batteries typically comprise an electroactive material which can be intercalated or reacted with lithium ions, such as lithium-transition metal oxides or mixed oxides, for example including $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or one or more phosphate compounds, for example including lithium iron phosphate or mixed lithium manganese-iron phosphate. The negative electrode typically includes a lithium insertion material or an alloy host material. For example, typical electroactive materials for forming an anode include graphite and other forms of carbon, silicon and silicon oxide, tin and tin alloys.

One approach to increase the power of lithium-ion electrochemical cells is to create systems that include electrodes with both a high energy capacity electroactive material and a high power capacity electroactive material (for example, a first positive electrode comprising a high energy capacity electroactive material and a second positive electrode comprising a high power capacity electroactive material). Energy capacity or density is an amount of energy the battery can store with respect to its mass (watt-hours per kilogram (Wh/kg)). Power capacity or density is an amount of power that can be generated by the battery with respect to its mass (watts per kilogram (W/kg)). However, hybridization of different electrode active material chemistries has in certain cases been limited by a mismatch of voltage ranges among various cathode or anode electroactive materials.

Accordingly, it would be desirable to develop hybrid lithium-ion electrochemical cells that can successfully use two different electroactive materials regardless of voltage mismatch, especially for transportation applications. In addition, it would be desirable that such materials and methods enhance the energy capacity and fast charging capabilities of the lithium-ion batteries.

SUMMARY

This section provides a general summary of the disclosure, and is not a comprehensive disclosure of its full scope or all of its features.

The present disclosure relates to a hybrid lithium-ion electrochemical cell including a first electrode having a first polarity and that includes a first electroactive material that reversibly cycles lithium ions. The electrochemical cell also includes a second electrode having the first polarity and that includes a second electroactive material that reversibly cycles lithium ions distinct from the first electroactive material. At least one third electrode includes a third electroactive material that reversibly cycles lithium ions and having a second polarity opposite to the first polarity. The electrochemical cell includes at least one voltage modification component in electrical communication with the first electrode and the second electrode. The hybrid lithium-ion electrochemical cell has a first operational state corresponding to charging and a second operational state corresponding to discharging. The at least one voltage modification component is configured to induce a voltage drop in the first operational state or the second operational state.

In one aspect, the at least one voltage modification component is selected from the group consisting of: a diode, a p-n junction diode, a Schottky diode, a triode, a transistor, a thyristor, a field effect transistor, an electronic device including a p-n-junction, and combinations thereof.

In one aspect, the electrochemical cell further includes at least two voltage modification components in electrical connection with the first electrode and the second electrode. A first voltage modification component is configured to induce a first voltage drop in the first or second operational state and a second voltage modification component is configured to permit current to pass in the other of the first or second operational state.

In one aspect, the first electrode and the second electrode are connected either in parallel or in series.

In one aspect, the at least one voltage modification component further includes a plurality of voltage modification components connected in series, so that the voltage drop is a cumulative voltage drop generated by the plurality of voltage modification components.

In one aspect, the at least one voltage modification component further includes a plurality of voltage modification components connected in parallel to lower resistance.

In one aspect, the voltage drop is greater than 0 V and less than or equal to about 5 V.

In one aspect, the first electrode is a first positive electrode and the second electrode is a second positive electrode. The first electroactive material is selected from the group consisting of: $LiNiMnCoO_2$, $Li(Ni_xMn_yCo_z)O_2)$, where $0 \leq x \leq 1$, $0 \leq y \leq 1$, $0 \leq z \leq 1$, and $x+y+z=1$, $LiNiCoAlO_2$, $LiNi_{1-x-y}Co_xAl_yO_2$ (where $0 \leq x \leq 1$ and $0 \leq y \leq 1$), $LiNi_xMn_{1-x}O_2$ (where $0 \leq x \leq 1$), $LiMn_2O_4$, $Li_{1+x}MO_2$ (where M is one of Mn, Ni, Co, Al and $0 \leq x \leq 1$), $LiMn_2O_4$ (LMO), $LiNi_xMn_{1.5}O_4$, $LiV_2(PO_4)_3$, $LiFeSiO_4$, $LiMPO_4$ (where M is at least one of Fe, Ni, Co, and Mn), activated carbon, and combinations thereof.

In one aspect, the at least one third electrode is a negative electrode and the third electroactive material is selected from the group consisting of: lithium metal, lithium alloy, silicon (Si), silicon alloy, silicon oxide activated carbon, hard carbon, soft carbon, graphite, graphene, carbon nanotubes, lithium titanium oxide ($Li_4Ti_5O_{12}$), tin (Sn), vanadium oxide ($V_2O_5$), titanium dioxide ($TiO_2$), titanium niobium oxide ($Ti_xNb_yO_z$ where $0 \leq x \leq 2$, $0 \leq y \leq 24$, and $0 \leq z \leq 64$), ferrous sulfide (FeS), and combinations thereof.

In one aspect, the second electroactive material is selected from the group consisting of: silicon oxide activated carbon, hard carbon, soft carbon, porous carbon materials, graphite, graphene, carbon nanotubes, carbon xerogels, mesoporous carbons, templated carbons, carbide-derived carbons (CDCs), graphene, porous carbon spheres, heteroatom-doped carbon materials, metal oxides of noble metals, $RuO_2$, transition metals, hydroxides of transition metals, $MnO_2$, NiO, $Co_3O_4$, $Co(OH)_2$, $Ni(OH)_2$, polyaniline (PANI), polypyrrole (PPy), polythiophene (PTh), and combinations thereof.

In one aspect, the first electroactive material has a first electrochemical potential and the second electroactive material has a second electrochemical potential. A difference between the second electrochemical potential and the first electrochemical potential defines a predetermined voltage difference. The voltage drop corresponds to the predetermined voltage difference.

In one aspect, the first electrode is a first negative electrode and the second electrode is a second negative electrode. The first electroactive material is selected from the group consisting of: lithium metal, lithium alloy, silicon (Si), silicon alloy, silicon oxide activated carbon, hard carbon, soft carbon, graphite, graphene, carbon nanotubes, lithium titanium oxide ($Li_4Ti_5O_{12}$), tin (Sn), vanadium oxide ($V_2O_5$), titanium dioxide ($TiO_2$), titanium niobium oxide ($Ti_xNb_yO_z$ where $0 \leq x \leq 2$, $0 \leq y \leq 24$, and $0 \leq z \leq 64$), ferrous sulfide (FeS), and combinations thereof. The second electroactive material is selected from the group consisting of: silicon oxide activated carbon, hard carbon, soft carbon, porous carbon materials, graphite, graphene, carbon nanotubes, carbon xerogels, mesoporous carbons, templated carbons, carbide-derived carbons (CDCs), graphene, porous carbon spheres, heteroatom-doped carbon materials, metal oxides of noble metals, $RuO_2$, transition metals, hydroxides of transition metals, $MnO_2$, NiO, $Co_3O_4$, $Co(OH)_2$, $Ni(OH)_2$, polyaniline (PANI), polypyrrole (PPy), polythiophene (PTh), and combinations thereof.

In one aspect, the third electrode is a positive electrode and the third electroactive material is selected from the group consisting of: $LiNiMnCoO_2$, $Li(Ni_xMn_yCo_z)O_2)$, where $0 \leq x \leq 1$, $0 \leq y \leq 1$, $0 \leq z \leq 1$, and $x+y+z=1$, $LiNiCoAlO_2$, $LiNi_{1-x-y}Co_xAl_yO_2$ (where $0 \leq x \leq 1$ and $0 \leq y \leq 1$), $LiNi_xMn_{1-x}O_2$ (where $0 \leq x \leq 1$), $LiMn_2O_4$, $Li_{1+x}MO_2$ (where M is one of Mn, Ni, Co, Al and $0 \leq x \leq 1$), $LiMn_2O_4$ (LMO), $LiNi_xMn_{1.5}O_4$, $LiV_2(PO_4)_3$, $LiFeSiO_4$, $LiMPO_4$ (where M is at least one of Fe, Ni, Co, and Mn), activated carbon, and combinations thereof.

The present disclosure also relates to an electrochemical device including a plurality of electrochemical cells that include at least one first electrode having a first polarity and that includes a first electroactive material that reversibly cycles lithium ions. The plurality of electrochemical cells also include at least one second electrode having the first polarity and that includes a second electroactive material that reversibly cycles lithium ions and is distinct from the first electroactive material. The plurality of electrochemical cells also include at least one third electrode including a third electroactive material that reversibly cycles lithium ions having a second polarity opposite to the first polarity. At least two diodes in electrical communication with the first electrode and the second electrode are also provided. The electrochemical device has a first operational state corresponding to charging and a second operational state corresponding to discharging. A first of the at least two diodes is configured to induce a first voltage drop in the first operational state and a second of the at least two diodes is configured to permit current to flow in the second operational state. The electrochemical device also includes a housing that encases the plurality of electrochemical cells.

In one aspect, the plurality of electrochemical cells either define: (i) a stack and the at least two diodes are disposed inside the stack; or (ii) a stack or a cell core and the at least two diodes are disposed external to the stack or the cell core, but inside the housing.

In one aspect, the first electrode and the second electrode are connected either in parallel or in series.

In one aspect, the first electrode is a first positive electrode and the second electrode is a second positive electrode. The first electroactive material is selected from the group consisting of: $LiNiMnCoO_2$, $Li(Ni_xMn_yCo_z)O_2)$, where $0 \leq x \leq 1$, $0 \leq y \leq 1$, $0 \leq z \leq 1$, and $x+y+z=1$, $LiNiCoAlO_2$, $LiNi_{1-x-y}Co_xAl_yO_2$ (where $0 \leq x \leq 1$ and $0 \leq y \leq 1$), $LiNi_xMn_{1-x}O_2$ (where $0 \leq x \leq 1$), $LiMn_2O_4$, $Li_{1+x}MO_2$ (where M is one of Mn, Ni, Co, Al and $0 \leq x \leq 1$), $LiMn_2O_4$ (LMO), $LiNi_xMn_{1.5}O_4$, $LiV_2$ (PO$_4$)$_3$, LiFeSiO$_4$, LiMPO$_4$ (where M is at least one of Fe, Ni, Co, and Mn), activated carbon, and combinations thereof.

In one aspect, the first electrode is a first negative electrode and the second electrode is a second negative electrode. The first electroactive material and the second electroactive material are independently selected from the group consisting of: lithium metal, lithium alloy, silicon (Si), silicon alloy, silicon oxide activated carbon, hard carbon, soft carbon, graphite, graphene, carbon nanotubes, lithium titanium oxide (Li$_4$Ti$_5$O$_{12}$), tin (Sn), vanadium oxide (V$_2$O$_5$), titanium dioxide (TiO$_2$), titanium niobium oxide (Ti$_x$Nb$_y$O$_z$ where 0≤x≤2, 0≤y≤24, and 0≤z≤64), ferrous sulfide (FeS), and combinations thereof.

The present disclosure further relates to an electrochemical device including a first cell core that includes at least one first electrode having a first polarity and that includes a first electroactive material that reversibly cycles lithium ions. A first electrical terminal is connected to the at least one first electrode. The first core cell also has at least one second electrode including a second electroactive material that reversibly cycles lithium ions having a second polarity opposite to the first polarity. A second electrical terminal connected to the at least one second electrode. The electrochemical device also includes a second cell core that includes at least one third electrode having the first polarity and that includes a third electroactive material that reversibly cycles lithium ions. A third electrical terminal connected to the at least one third electrode. At least one fourth electrode having the second polarity and including a fourth electroactive material. A fourth electrical terminal is connected to the at least one fourth electrode. The first electrical terminal and the third electrical terminal are electrically connected and the second electrical terminal and the fourth electrical terminal are electrically connected. At least two voltage modification components are in electrical communication with the first electrical terminal and the third electrical terminal. The electrochemical device has a first operational state corresponding to charging and a second operational state corresponding to discharging. A first of the at least two voltage modification components is configured to induce a voltage drop in the first operational state and a second of the voltage modification components is configured to permit current to flow in the second operational state.

In one aspect, the second electroactive material and the fourth electroactive material are distinct and the electrochemical device further includes: a third voltage modification component and a fourth voltage modification component in electrical communication with the second electrical terminal and the fourth electrical terminal. The third voltage modification component is configured to induce a voltage drop in the first operational state and the fourth voltage modification component is configured to permit current to flow in the second operational state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows a schematic of a voltage mismatch in a hybrid lithium-ion electrochemical cell including a first positive electrode with a first electroactive material, a second positive electrode with a distinct second electroactive material, and a negative electrode with a negative electroactive material.

FIGS. 2A-2C show a simplified schematic design of a hybrid lithium-ion electrochemical cell including a first positive electrode with a first electroactive material, a second positive electrode with a distinct second electroactive material, and a negative electrode with a negative electroactive material that has the voltage potential windows described in FIG. 1. FIG. 2A shows a configuration of the hybrid-lithium ion electrochemical cell, FIG. 2B shows the hybrid-lithium ion electrochemical cell during a first operational state of charging, and FIG. 2C shows the hybrid-lithium ion electrochemical cell during a second operational state of discharging.

FIGS. 3A-3C show a hybrid lithium-ion electrochemical cell that cycles lithium ions including a first positive electrode with a first electroactive material, a second positive electrode with a distinct second electroactive material, a negative electrode with a negative electroactive material, and two voltage modification components (e.g., diodes) in electrical communication with the first and second positive electrodes prepared in accordance with certain aspects of the present disclosure. FIG. 3A shows a configuration of the hybrid-lithium ion electrochemical cell, FIG. 3B shows the hybrid-lithium ion electrochemical cell during a first operational state of charging, and FIG. 3C shows the hybrid-lithium ion electrochemical cell during a second operational state of discharging.

FIG. 4 is a simplified schematic of a p-n heterojunction semiconductor type diode with accompanying symbols that generally illustrates diode device operational principles.

FIGS. 5A-5B. FIG. 5A shows a schematic of a comparative hybrid-lithium ion electrochemical cell having a first positive electrode with a first electroactive material, a second positive electrode with a distinct second electroactive material, and a negative electrode with a negative electroactive material. FIG. 5B shows voltage versus performance for the comparative hybrid-lithium ion electrochemical cell in FIG. 5A.

FIGS. 6A-6B. FIG. 6A shows a hybrid lithium-ion electrochemical cell prepared in accordance with certain aspects of the present disclosure. The hybrid-lithium ion electrochemical cell has a first positive electrode with a first electroactive material, a second positive electrode with a distinct second electroactive material, a negative electrode with a negative electroactive material, and two voltage modification components (e.g., diodes) in electrical communication with the first and second positive electrodes. FIG. 6B shows voltage versus performance for the hybrid-lithium ion electrochemical cell in FIG. 6A.

FIGS. 7A-7B. FIG. 7A shows one variation of a hybrid lithium-ion electrochemical cell that cycles lithium ions according to certain aspects of the present disclosure, where two distinct positive electrodes are connected in parallel and in electrical communication with two voltage modification components. FIG. 7B shows an electrochemical cell stack including a plurality of hybrid lithium-ion electrochemical cells like those in FIG. 7A.

FIGS. 8A-8B. FIG. 8A shows one variation of a hybrid lithium-ion electrochemical cell that cycles lithium ions according to certain aspects of the present disclosure, where two distinct positive electrodes are connected in parallel and in electrical communication with two voltage modification components and two distinct negative electrodes are connected in parallel and in electrical communication with two voltage modification components. FIG. 8B shows an electrochemical cell stack including a plurality of hybrid lithium-ion electrochemical cells like those in FIG. 8A.

FIGS. 9A-9B. FIG. 9A shows one variation of a hybrid lithium-ion electrochemical cell that cycles lithium ions according to certain aspects of the present disclosure, where two distinct positive electrodes are connected in series and in electrical communication with two voltage modification components. FIG. 9B shows an electrochemical cell stack including a plurality of hybrid lithium-ion electrochemical cells like those in FIG. 9A.

FIGS. 10A-10B. FIG. 10A shows one variation of a hybrid lithium-ion electrochemical cell that cycles lithium ions according to certain aspects of the present disclosure, where two distinct positive electrodes are connected in series and in electrical communication with two voltage modification components and two distinct negative electrodes are connected in series and in electrical communication with two voltage modification components. FIG. 10B shows an electrochemical cell stack including a plurality of hybrid lithium-ion electrochemical cells like those in FIG. 10A.

Corresponding reference numerals indicate corresponding parts throughout the several views of the drawings.

DETAILED DESCRIPTION

Figure 4:
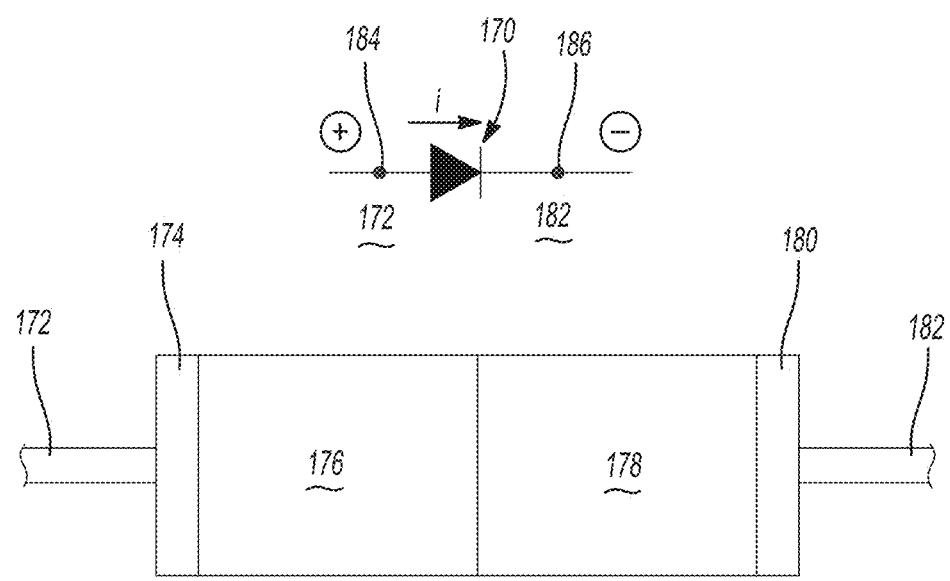

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to improved electrochemical cells that may be incorporated into energy storage devices like lithium-ion batteries, which may be used in various applications, such as vehicles or other transport applications. However, the present technology may also be used in other electrochemical devices, especially those that cycle lithium ions, including consumer products. Batteries store electrical energy within chemical components or electroactive materials in the electrodes that have differing electrochemical potentials. The difference between a first electrochemical potential of a negative electroactive material in a negative electrode and a second electrochemical potential of a positive electroactive material in a positive electrode determines the battery voltage.

Many lithium-ion electrochemical cells have been designed to have high-energy capacity and thus include high-energy capacity electroactive materials. However, batteries that exhibit not only high-energy capacity that extends battery capacity to provide prolonged battery life between charges, but also that exhibit high-power capacity can be desirable. High power capacity can provide fast discharging or charging capacity. Thus, power of lithium-ion electrochemical cells can be increased by including electrodes with distinct electroactive materials for electrodes having the same polarity, for example, both a high-energy capacity electroactive material and a high power capacity electroactive material.

In certain aspects, the hybrid lithium-ion electrochemical cells may be considered to be capacitor-assisted batteries ("CABs") (e.g., a lithium-ion capacitor hybridized with a lithium-ion battery in a single cell core). Such a hybrid electrochemical cell may provide several advantages, such as enhanced power capability compared with lithium-ion batteries. For example, integrated capacitors or super capacitors may be used to supply current during engine startup so as to limit current draw from the lithium-ion battery during start-up. However, capacitor-assisted systems may experience comparatively low energy densities and thus low energy capacity. As noted above, in certain aspects, the ability to include different electrode active material chemistries has been limited by a mismatch of voltage ranges among various cathode or anode electroactive materials.

FIG. 1 shows a schematic demonstrating voltage mismatch in a hybrid lithium-ion electrochemical cell including a first positive electrode with a first electroactive material, a second positive electrode with a distinct second electroactive material, and a negative electrode with a negative electroactive material. Notably, the first electroactive material and distinct electroactive material may be provided as distinct electrodes within the cell or may be combined together, for example, as distinct layers, within a single electrode.

In FIG. 1, a first voltage window 20 is shown for the first positive electroactive material, a second voltage window 22 is shown for the second positive electroactive material, and a third voltage window 24 is shown for the negative electroactive material. The y-axis 30 in FIG. 1 represents voltage, while the x-axis 32 represents power. The first voltage window 20 of the first positive electroactive material has a much higher first maximum voltage 34 than a second maximum voltage 36 the second voltage window 22 of the second positive electroactive material. Generally, the first positive electroactive material can generate significant amounts of energy, while the second positive electroactive material can generate a significant amount of power.

A voltage difference 38 is thus defined between the first maximum voltage 34 and the second maximum voltage 36. In certain aspects, the second maximum voltage 36 may correspond to an electrochemical potential of the second electroactive material. In other aspects, the second maximum voltage 36 is due to adverse conditions that may occur for the second electroactive material when operated above certain voltages. For example, if the second positive electroactive material exceeds its upper limit of the second maximum voltage 36 during charging, it can potentially suffer from structural instability, potential interaction and side reactions with electrolyte, and undesirable growth of solid electrolyte interlayers (SEIs). Thus, conventionally during charging of a hybrid cell including both the first positive electroactive material having the first maximum voltage 34 and the second positive electroactive material having the second maximum voltage 36, a maximum voltage is restricted to the second maximum voltage 36, which limits realizing a full operational potential of the first positive electroactive material and generally limits hybrid electrochemical cell design where matching of electrochemical potentials becomes a design consideration.

FIGS. 2A-2C show a simplified schematic design of a lithium-ion electrochemical cell 50 having the voltage potential windows described in FIG. 1. FIG. 2A shows the basic configuration of the electrochemical cell 50 that includes a first positive electrode 52 and a second positive electrode 54. The first positive electrode 52 is a bilayer structure comprising a first positive electroactive material in layers formed on each side of a first positive current collector 56. The second positive electrode 54 comprises a second positive electroactive material disposed on one side of a second positive current collector 58. As noted above, the first positive electroactive material in the first positive electrode 52 is distinct from the second positive electroactive material in the second positive electrode 54. The first positive electrode 52 and the second positive electrode 54 are electrically connected in parallel. Two negative electrodes 60 comprising the same negative electroactive material are formed on negative current collectors 62, one as a bi-layer electrode and one as a single layer electrode, by way of example. The two negative electrodes 60 are likewise connected in parallel with one another.

The lithium-ion electrochemical cell 50 also includes separators 64 that maintain electrical insulation between electrodes, but permit ions to flow therethrough. Thus, the separators 64 serve as both an electrical insulator and a mechanical support, by being sandwiched between electrodes of opposite polarity to prevent physical contact and thus, the occurrence of a short circuit. The separators 64 are disposed between electrodes of opposite polarity (e.g., between first positive electrode 52 and respective negative electrode 60 or between second positive electrode 54 and respective negative electrode 60). Further, the electrochemical cell 50 further includes at least one electrolyte 66, whether in solid or liquid form, to ensure conduction of ions between electrodes. Where the electrolyte 66 is a liquid electrolyte, it may be imbibed within pores of a polymeric or ceramic separator 64 membrane. Where the electrolyte 66 is a solid electrolyte comprising a plurality of electrolyte particles, it may be combined with separator particles to provide a porous layer with the desired electrical insulating properties. For simplicity, FIGS. 2B-2C do not show the electrolyte 66.

Furthermore, the lithium-ion electrochemical cell 50 can include a variety of other components that while not depicted here are nonetheless known to those of skill in the art. For instance, the lithium-ion electrochemical cell 50 may include a casing, gaskets, terminal caps, battery terminals, and any other conventional components or materials that may be situated within the electrochemical cell 50, including between or around the negative electrode 60, the first positive electrode 52, and/or the second positive electrode 54, by way of non-limiting example. As noted above, the size and shape of the lithium-ion electrochemical cell 50 may vary depending on the particular application for which it is designed.

FIG. 2B shows a charging process for the lithium-ion electrochemical cell 50. The lithium-ion electrochemical cell 50 can be charged or re-powered at any time by applying an external power source (e.g., charging device) to the electrochemical cell 50 to reverse electrochemical reactions that occur during battery discharge (described below). Thus, lithium ions flow from the first positive electrode 52 and the second positive electrode 54 towards the negative electrodes 60. An external power source (not shown) that may be used to charge the lithium-ion electrochemical cell 50 may vary depending on the size, construction, and particular end-use of the electrochemical cell 50. Some suitable external power sources include, but are not limited to, an AC wall outlet and a motor vehicle alternator. The connection of an external power source to the lithium-ion electrochemical cell 50 compels the otherwise non-spontaneous oxidation of lithium at the first positive electrode 52 and/or at the second positive electrode 54 to produce electrons and lithium ions. Thus, electrons flow back towards the negative electrodes 60 through an external circuit (not shown), while the lithium ions are transported internally through the electrochemical cell 50 (e.g., through electrolyte across a porous separator) back towards the negative electrodes 60, where they are reunited to replenish the electroactive material in the negative electrodes 60 with lithium for consumption during the next battery discharge cycle. Thus, lithium ions and electrons move from the first positive electrode 52 and the second positive electrode 54 to the negative electrode 60 during charging of the battery, as shown by arrows 70 in FIG. 2B.

In FIG. 2B, during the charging process, a first voltage ($V_1$) of the first positive electrode 52 is equal to a second voltage ($V_2$) of the second positive electrode 54. As described in the context of FIG. 1, these charge voltages are constrained by the highest voltage of the electroactive material having the lower voltage window, for example, the second maximum voltage 36 of the second voltage window 22 for the second positive electroactive material (e.g., second positive electrode 54).

FIG. 2C shows a discharging process for the lithium-ion electrochemical cell 50 during which the lithium-ion electrochemical cell 50 generates electric current. The lithium-ion electrochemical cell 50 generates current by way of reversible electrochemical reactions that occur when an external circuit is closed (to connect the negative electrode 60 with the first and second positive electrodes 52, 54). In this state, the negative electrode 60 contains a relatively greater quantity of cyclable lithium. The chemical potential difference between the first positive electrode 52 and/or second positive electrode 54 versus the negative electrode 60 drives electrons produced by the oxidation of lithium (e.g., intercalated lithium) at the negative electrode 60 through the external circuit toward the positive electrodes 52, 54. Lithium ions, which are also produced at the negative electrode 60, are concurrently transferred through the electrolyte and separator 64 towards the positive electrodes 52, 54. The electrons flow through the external circuit and the lithium ions migrate across the porous separator 64 in the electrolyte to form intercalated or alloyed lithium at the positive electrodes 52, 54. The electric current passing through the external circuit can be harnessed and directed through the load device until the intercalated lithium in the negative electrode 60 is depleted and the capacity of the lithium-ion electrochemical cell 50 is diminished.

Accordingly, the lithium-ion electrochemical cell 50 can generate electric current for a load device that can be operatively connected to the external circuit. While the load device may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device may also be a power-generating apparatus that charges the lithium-ion electrochemical cell 50 for purposes of storing energy. In certain other variations, the electrochemical cell may store energy from a power-generating load.

In FIG. 2C, during the discharging process, a third voltage ($V_3$) of the first positive electrode 52 is equal to a fourth voltage ($V_4$) of the second positive electrode 54. As described in the context of FIG. 1, again, these voltages during discharge are limited by the second voltage window 22 corresponding to the second positive cathode 54. As such, the voltage mismatch between the first voltage window 20 and the second voltage window 22 constrains selection of materials and design of electrochemical cells.

In accordance with certain aspects of the present disclosure, a hybrid electrochemical cell, such as a hybrid lithium-ion electrochemical cell like a capacitor-assisted lithium ion battery, is provided that includes a first electrode and a second electrode each having the same polarity, and a third electrode having an opposite polarity from the first polarity. The cell also includes a separator and an electrolyte. The first electrode comprises a first electroactive material and the second electrode comprises a second electroactive material. In various aspects, the first electrode may be limited in operation by a voltage difference that occurs with respect to a second electrode. In certain aspects, the first electroactive material may have a first electrochemical potential, the second electroactive material may have a second distinct electrochemical potential. In other aspects, the second electroactive material may be limited to a certain operational voltage, for example, due to undesirable side reactions with electrolyte at high voltages, for example. In this manner, during operation of such hybrid electrochemical cells, a maximum voltage may be limited. In certain variations, where the first electrode and the second electrode are positive electrodes, a difference between a first maximum operational voltage of the first electrode and a second maximum operational voltage of the second electrode may be considered to be a predetermined voltage difference. The third electrode also comprises a third electroactive material. In other variations, where the first electrode and the second electrode are negative electrodes, a difference between a first minimum operational voltage of the first electrode and a second minimum operational voltage of the second electrode may be considered to be a predetermined voltage difference.

The hybrid lithium-ion electrochemical cell further comprises at least one voltage modification component. The first electrode, the second electrode, and the voltage modification component are electrically connected to one another. The at least one voltage modification component creates a change in voltage (e.g., a voltage drop) that compensates for a voltage mismatch between a first maximum or minimum voltage associated with the first electrode versus a second maximum or minimum voltage associated with the second electrode during either charging or discharging. In certain aspects, the electrochemical cell comprises at least two voltage modification components electrically connected to the first electrode and the second electrode, one configured to provide a reduction in voltage (either inducing a change in voltage during charging or discharging) and the other configured to permit current to flow in the other direction (the other of charging or discharging).

By way of example, FIGS. 3A-3C show a hybrid lithium-ion electrochemical cell 100 that cycles lithium ions. The hybrid lithium-ion electrochemical cell 100 has a first electrode 110 having a first polarity, for example, a first positive electrode. The first electrode 110 includes a current collector 112. The first electrode 110 also includes at least one first electroactive material layer 114 that comprises a first electroactive material that reversibly cycles lithium ions. The first electrode may have a first maximum operational voltage that can be represented by voltage ($V_1$). In certain aspects, the first electroactive material may have a first electrochemical potential that corresponds to the first maximum operational voltage. As shown, the first electrode 110 is a bilayer structure having two distinct first electroactive material layers 114 disposed on opposite sides of the current collector 112.

The electrochemical cell 100 also includes a second electrode 120. The second electrode 120 has the same first polarity as the first electrode 110. The second electrode 120 includes a current collector 122. The second electrode 120 also includes a second electroactive material layer 124 that comprises a second electroactive material that reversibly cycles lithium ions with a second maximum operational voltage, which can be represented by voltage ($V_2$). In certain aspects, the second electroactive material may have a second electrochemical potential that corresponds to the second maximum operational voltage, although as noted above, the second maximum operational voltage may be limited due to other reasons. A difference between the second electrochemical potential or maximum operational voltage and the first electrochemical potential or maximum operational voltage defines a predetermined voltage difference ($\Delta V = V_1 - V_2$). In alternative aspects, where the first electrode and the second electrode are negative electrodes, a difference between a first minimum operational voltage of the first electrode and a second minimum operational voltage of the second electrode may be considered to be the predetermined voltage difference.

The electrochemical cell 100 also includes one or more third electrodes 130. As shown in FIGS. 3A-3C, the electrochemical cell 100 has two distinct third electrodes 130. Each third electrode 130 has a second polarity opposite to the first polarity of the first and second electrodes 110, 120. For example, where the first electrode 110 and the second electrode 120 are positive electrodes, the third electrode 130 is a negative electrode. As described further herein, in other variations, the first electrode 110 and the second electrode 120 may be negative electrodes, so that the third electrode 130 is a positive electrode. Each third electrode 130 includes a current collector 132. The third electrode 130 also includes at least one third electroactive material layer 134 that comprises a third electroactive material that reversibly cycles lithium ions. The third electroactive material may have a third electrochemical potential. As shown, the third electrode 130 is either a bilayer structure having two distinct third electroactive material layers 134 disposed on opposite sides of the current collector 132 on a monolayer structure where the third electroactive material layer 134 is disposed on only one side of the current collector 132.

The hybrid lithium-ion electrochemical cell 100 also includes one or more separators 140 disposed between electrodes of opposite polarities. As shown in FIGS. 3A-3C, three separators 140 are included, by way of non-limiting example. One separator 140 is disposed between a third electrode 130 and the first electrode 110. Another separator 140 is disposed between the first electrode 110 and another third electrode 130. Finally, yet another separator 140 is disposed between the third electrode 130 and the second electrode 120. The electrochemical cell 100 also includes an electrolyte 142 disposed within or adjacent to the separator 140 and thus between electrodes facing one another.

In the hybrid lithium-ion electrochemical cell 100, at least one voltage modification component is provided in electrical communication with the first electrode 110 and the second electrode 120. As shown in FIGS. 3A-3C, a first voltage modification component 150 is electrically connected to the first electrode 110 and the second electrode 120, for example, in a first direction that current will flow in a first operational state of the electrochemical cell 100, for example, during charging. A second voltage modification component 152 is also electrically connected to the first electrode 110 and the second electrode 120 in a second direction that current will flow in a second operational state of the electrochemical cell 100, for example, during discharging. As will be described further herein, the first voltage modification component 150 is configured to induce a voltage drop ($\Delta V'$) corresponding to the predetermined voltage difference ($\Delta V = V_1 - V_2$) in the first operational state, for example, during charging.

The voltage modification component or device, such as first voltage modification component 150 and second voltage modification component 152, can be any electrical circuitry component that promotes a reduction in voltage in a desired direction of current flow. In certain aspects, the at least one voltage modification component may be a diode. FIG. 4 is a simplified schematic of a p-n heterojunction semiconductor type diode 170 with accompanying symbols that generally illustrate the operational principles of a diode device. Generally, as background, a p-n junction diode is made of a semiconductor material, which may be silicon, germanium, gallium arsenide, and the like. Dopants are added to the semiconductor material to create a region on one side that contains negative charge carriers (electrons), typically known as an n-type semiconductor, and a region on the opposite side that contains positive charge carriers (holes), typically known as a p-type semiconductor. When the n-type and p-type materials are joined and electrically connected, a flow of electrons occurs from the n-type side to the p-type side resulting in a third region between the n-type side and the p-type side where no charge carriers are present. This is known as a depletion region, because there are no charge carriers present (free of electrons and holes). Terminals are attached to the n-type region and p-type region. A boundary between the n-type region and p-type region is called a p-n junction, which is where the diode's action takes place. When a sufficiently higher electrical potential is applied to the p-type side (the anode) than to the n-type side (the cathode), electrons flow through the depletion region from the n-type side to the p-type side. However, the p-n junction does not allow the flow of electrons in the opposite direction when the potential is applied in reverse.

With renewed reference to FIG. 4, the diode 170 thus includes an anode 172 that defines a first metal contact 174. The diode also includes a doped p-type region 176 that where a majority of holes (+) exist, while a doped n-type region 178 has a majority of electrons (−). The n-type region is adjacent to a second metal contact 180 that defines a cathode 182. Generally, above a threshold voltage for the diode 170, a voltage drop can occur in one direction if current is applied in a given direction. Depending on the semiconductor materials and dopants used in the doped p-type region 176 and doped n-type region 178, as well as current applied, the amount of voltage drop ($\Delta V'$) provided by the diode 170 can vary. As shown in FIG. 4, a first voltage ($V_1$) at point 184 may be compared to a second voltage ($V_2$) at point 186, where $\Delta V'=V_1-V_2$. For example, a diode incorporating silicon (Si) generally exhibits a voltage drop ($\Delta V'$) of greater than or equal to about 0.5V to less than or equal to about 0.7V, while a diode incorporating germanium (Ge) has a voltage drop of greater than or equal to about 0.05V to less than or equal to about 0.3V in a p-n diode device.

The diode is one example of a suitable voltage modification component. In certain variations, the at least one voltage modification component is selected from the group consisting of: a diode, a p-n junction diode, a Schottky diode, a triode, a transistor, a thyristor, a field effect transistor, an electronic device comprising a p-n-junction, and combinations thereof.

Notably, while not shown, voltage modification components or devices, such as first voltage modification component 150 and second voltage modification component 152, can be connected in series with one another to provide an additive or cumulative voltage drop. For example, if a single diode comprising silicon (Si) has an average voltage drop ($\Delta V'$) of about 0.5V, two of these diodes in series provide an average voltage drop ($\Delta V'$) of about 1V, three of these diodes in series provide an average voltage drop ($\Delta V'$) of about 1.5V and the like. Thus, when multiple voltage modification components are included in the electrochemical cell in series electrical connection with one another and with a first electrode and a second electrode, they may be configured to induce a cumulative voltage drop corresponding an average voltage drop for each device by the number of total devices connected together. In other aspects, while not shown, voltage modification components or devices, such as first voltage modification component 150 and second voltage modification component 152, can be connected in parallel with one another to provide an additive or cumulative resistance drop.

As noted above, a predetermined voltage difference between the second maximum operational voltage of the second electrode and the first maximum operational voltage of the first electrode may be greater than 0V and less than or equal to about 5V, optionally greater than or equal to about 1V to less than or equal to about 4.5V, and in certain aspects, optionally greater than or equal to about 1.5V to less than or equal to about 4V. Where a plurality of voltage modification components are provided in electrical communication with the first electrode and the second electrode, the voltage modification components are configured to induce a cumulative voltage drop corresponding to the predetermined voltage difference in the first or second operational state of the hybrid lithium-ion electrochemical cell (depending on which operational state the voltage drop is required).

With renewed reference to FIG. 3B, the hybrid lithium-ion electrochemical cell 100 is in a first operational state corresponding to charging. The first electrode 110 and the second electrode 120 are electrically connected in parallel. During charging, current is flowing in the direction of arrows 188 from the first electrode 110 and second electrode 120 (positive electrodes) towards the third electrode 130 (negative electrode). As the voltage exceeds the threshold voltage of the first voltage modification component 150, current flows therethrough and a voltage drop ($\Delta V'$) occurs. As shown in FIG. 3B, a first voltage ($V_1$) at point 190 may be compared to a second voltage ($V_2$) at point 192, where $V_1=V_2+\Delta V'$ in this operational state. Notably, the second voltage modification component 152 is biased so that it does not conduct current in the first operational state of charging. In this manner, the first electrode 110 and second electrode 120 can be successfully charged at high voltages without potential overcharging of the second electrode 120, due to the presence of the first voltage modification component 150 that provides the necessary voltage drop ($\Delta V'$).

In FIG. 3C, the hybrid lithium-ion electrochemical cell 100 is in a second operational state corresponding to discharging. During discharging, current is flowing in the direction of arrows 194 from the third electrode 130 (negative electrode) towards the first electrode 110 and second electrode 120 (positive electrodes). As the applied voltage exceeds the threshold voltage of the second voltage modification component 152, current flows therethrough. In certain aspects, the second voltage modification component 152 may be different from the first voltage modification component 150 and have a minimum voltage threshold to ensure current flow in the desired direction. As shown in FIG. 3C, a third voltage ($V_3$) at point 190 may be compared to a fourth voltage ($V_4$) at point 192, where $V_4=V_3+\Delta V'$ in this second operational state. Notably, the first voltage modification component 150 is biased so that it does not conduct current in the second operational state of discharging, so that current can be generated via the flow path through the second voltage modification component 152 and distributed to an external load device.

FIGS. 5A-5B and 6A-6B further illustrate the advantages of hybrid lithium-ion electrochemical cells prepared in accordance with certain aspects of the present disclosure. In FIG. 5A, a lithium-ion electrochemical cell 200 has a first positive electrode 210 that comprises a positive electroactive material in the form lithium manganese nickel oxide LiMn$_{1.5}$Ni$_{0.5}$O$_4$ (LMNO) that has an electrochemical potential of about 4.75 V versus a lithium metal reference (a potential versus Li/Li+) A second positive electrode 212 comprises a positive electroactive material in the form activated carbon. Activated carbon does not have an electrochemical potential, but is limited to a maximum operational voltage of about 4.3 V versus a lithium metal reference (a potential versus Li/Li+) due to unwanted side reactions that occur with electrolyte above this voltage. A negative electrode 214 comprises a negative electroactive material in the form of lithium titanate (Li$_4$Ti$_5$O$_{12}$) (LTO). LTO has an electrochemical potential of about 1.55 V versus a lithium metal reference (a potential versus Li/Li+). The first and second positive electrodes 210, 212 are electrically connected in parallel. Such a lithium-ion electrochemical cell 200 can be considered to be a capacitor-assisted battery, in that it includes a high power density electroactive material (activated carbon in the second positive electrode 232) to boost power performance of a high energy density electroactive material (LNMO) in the first positive electrode 230.

FIG. 6A shows a comparative hybrid lithium-ion electrochemical cell prepared in accordance with certain aspects of the present disclosure that includes two voltage modification components. Like the electrochemical cell in FIG. 5A, a lithium-ion electrochemical cell 220 in FIG. 6A has the same electrodes, electroactive materials, and electrical connection configurations. Thus, a first positive electrode 230 comprises a positive electroactive material in the form lithium manganese nickel oxide LiMn$_{1.5}$Ni$_{0.5}$O$_4$ (LMNO). A second positive electrode 232 comprises a positive electroactive material in the form activated carbon. A negative electrode 234 comprises a negative electroactive material in the form of lithium titanate (Li$_4$Ti$_5$O$_{12}$) (LTO). Again, the first and second positive electrodes 230, 232 are electrically connected in parallel. In FIG. 6A, the electrochemical cell 220 includes both a first voltage modification component 240 and a second voltage modification component 242, which may respectively be diodes, as shown. Both the first voltage modification component 240 and the second voltage modification component 242 are electrically connected to the first positive electrode 232 and the second positive electrode 234, but biased in different directions.

FIG. 5B shows voltage (y-axis designated 250 in volts (V)) over time (y-axis designated 252 in seconds) performance for the full cell lithium-ion electrochemical cell 200 in FIG. 5A that lacks any voltage modification components. Thus, only a single voltage trace 254 is measured. As noted above, activated carbon can suffer from side reactions with electrolyte when it is charged to potentials larger than 4.3V versus Li. The overall voltage during charging and discharging between the first positive electrode 210 and the second positive electrode 212 are the same due to the voltage mismatch between the LMNO and AC electroactive materials. FIG. 6B similarly shows voltage (y-axis designated 270 in volts (V)) over time (x-axis designated 272 in seconds) performance for the lithium-ion electrochemical cell 220 in FIG. 6A. In FIG. 6B, a first voltage trace 274 is measured for the first positive electrode 230 (LNMO versus LTO) and a second voltage trace 276 is measure for the second positive electrode 232 (Activated Carbon versus LTO). A voltage difference 278 between the second electrochemical potential of the second positive electrode 232 and the first electrochemical potential of the first positive electrode 230 is also shown.

In FIG. 5B, the measured voltage trace 254 includes a first zone designated 260, a second zone designated 262, a third zone designated 264, and a fourth zone designated 266. A battery may be charged by both a constant current (CC) and a constant voltage (CV) process. Thus, the first zone 260 is one of constant current (CC) charging, while the second zone 262 is one of constant voltage (CV) charging. The third zone 264 designates a rest period, while the fourth zone 266 shows discharging of the lithium-ion electrochemical cell 200. In the first zone 260, the battery is charged by a high constant current flow to its cut-off voltage, such as 3.25V for the LNMO/LTO pair, but lithium-ion electrochemical cell/battery 200 is only full to about 80 to 90% of its overall capacity. In the second zone 262, a lower current is then used to charge the battery by using constant voltage charge. By applying 3.25V to the LNMO/LTO during the constant voltage phase, its current will be lower and lower, until the current meets the requirement, which is about 0.05 times of constant current. However, as noted above, the second positive electrode including activated carbon reacts with electrolyte, so it will always have a current higher than the requirement of current. Thus, the constant voltage (CV) charging process in the second zone 262 does not stop until it reaches the protecting time.

FIG. 6B similarly shows a first zone designated 280, a second zone designated 282, a third zone designated 284, and a fourth zone designated 286 for both first voltage trace 274 and second voltage trace 276. Again, the first zone 280 is one of constant current (CC) charging, while the second zone 282 is one of constant voltage (CV) charging. The third zone 284 designates a rest period, while the fourth zone 286 shows discharging of the lithium-ion electrochemical cell 220 that includes both the first voltage modification component 240 and a second voltage modification component 242. An initial portion of the fourth zone 286 corresponds to discharge of the LMNO/LTO first positive electrode 230, while a subsequent portion of the fourth zone 286 showing the voltage difference at region 288 corresponds to capacity of the activated carbon/LTO during discharge. Notably, the overall cycle time for the lithium-ion electrochemical cell 220 prepared in accordance with certain aspects of the present disclosure in FIG. 6B is about 5,500 seconds less than an overall cycle time for the comparative lithium-ion electrochemical cell 200 in FIG. 5B. This is due to the fact that the second zone 282 for the lithium-ion electrochemical cell 220 in FIG. 6B is comparatively shorter than the second zone 262 for the lithium-ion electrochemical cell 200 in FIG. 5B. In addition to a shorter charging time and shorter overall cycle time, a shorter constant voltage (CV) advantageously means there is less available reaction time between activated carbon in the second positive electrode 232 and electrolyte.

Figure 7A:
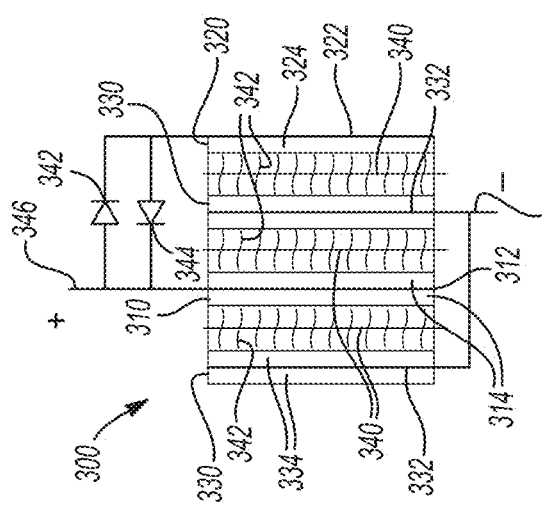
Figure 7B:
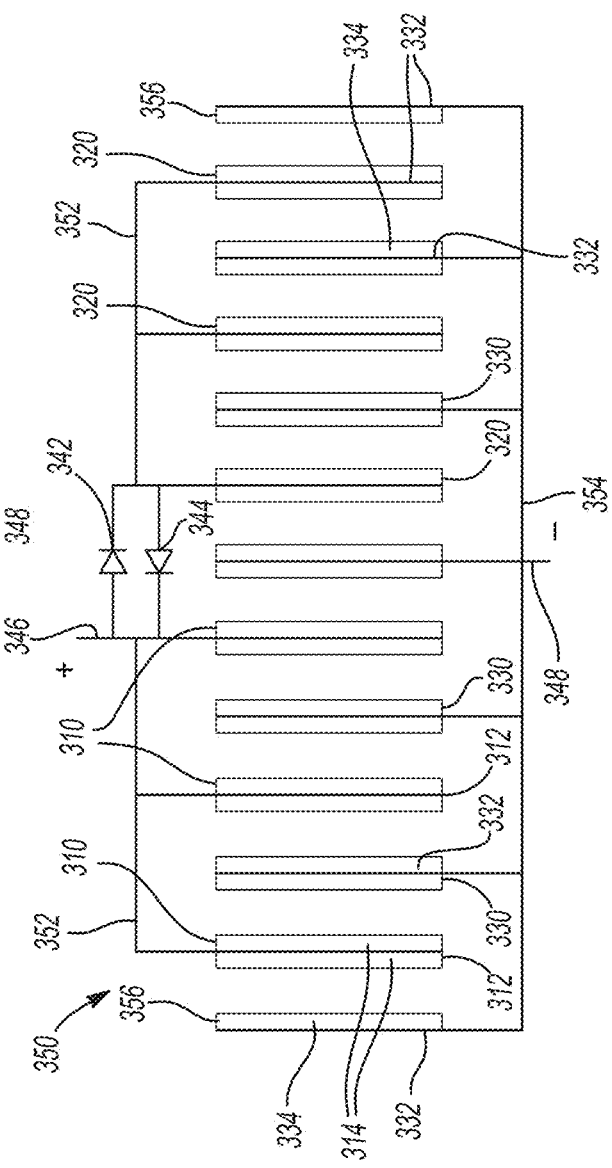

FIGS. 7A-7B shows one variation of a hybrid lithium-ion electrochemical cell that cycles lithium ions. FIG. 7A shows a single hybrid lithium-ion electrochemical cell 300 including two distinct positive electrodes connected in parallel along with two voltage modification components prepared in accordance with certain aspects of the present disclosure. FIG. 7B shows a stack 350 including a plurality of hybrid lithium-ion electrochemical cells like those in FIG. 7A having a plurality of distinct positive electrodes and voltage modification components connected in parallel. In FIG. 7A, the hybrid lithium-ion electrochemical cell 300 has a first positive electrode 310 having a first polarity (e.g., a positive polarity or cathode). The first positive electrode 310 includes a current collector 312. The first positive electrode 310 is a bilayer design that includes two first positive electroactive material layers 314 on opposite sides of the current collector 312. Each first positive electroactive material layer 314 comprises a first positive electroactive material that reversibly cycles lithium ions. In certain aspects, the first positive electroactive material layers 314 may have a first electrochemical potential.

The electrochemical cell 300 also includes a second positive electrode 320. The second positive electrode 320 has a first polarity like the first positive electrode 310. The second positive electrode 320 includes a current collector 322. The second positive electrode 320 also includes a second positive electroactive material layer 324 that comprises a second positive electroactive material that reversibly cycles lithium ions. The second positive electrode 320 may have a second maximum operational voltage that may be less than a maximum operational voltage of the first positive electrode 310. In certain aspects, the second maximum operational voltage may correspond to the second positive electroactive material having a second electrochemical potential different from the electrochemical potential of the first positive electrochemical potential in the first positive electrode 310. While the design of the second positive electrode 320 in FIG. 7A has only a single second positive electroactive material layer 324, it should be noted that while not shown, this electrode may likewise be modified to be a bilayer design where two distinct second positive electroactive material layers 324 are disposed on opposite sides of the current collector 322.

The electrochemical cell 300 also includes two third negative electrodes 330 (e.g., an anode) having a negative polarity. Each third negative electrode 330 includes a current collector 332. The third negative electrode 330 is a bilayer design that includes two negative electroactive material layers 334 that respectively comprise a third negative electroactive material that reversibly cycles lithium ions and has a third electrochemical potential. Each distinct third negative electroactive material layers 334 disposed on opposite sides of the current collector 332.

The hybrid lithium-ion electrochemical cell 300 also includes a plurality of separators 340 disposed between electrodes of opposite polarities. As shown in FIGS. 7A-7B, three separators 340 are included, by way of non-limiting example. One separator 340 is disposed between one third negative electrode 330 and the first positive electrode 310. Another separator 340 is disposed between the first positive electrode 310 and another third negative electrode 330. Finally, yet another separator 340 is disposed between the third negative electrode 330 and the second positive electrode 320. The electrochemical cell 300 also includes an electrolyte 342 disposed within or adjacent to the separator 340 and thus between electrodes facing one another.

In the hybrid lithium-ion electrochemical cell 300, two voltage modification components are provided in electrical communication with the first positive electrode 310 and the second positive electrode 320. As shown in FIGS. 7A-7B, a first voltage modification component in the form of a first diode 342 is electrically connected to the first positive electrode 310 and the second positive electrode 320 that facilitates current flow in a first direction in a first operational state of the electrochemical cell 300, for example, during charging. A second voltage modification component in the form of a second diode 344 is also electrically connected to the first positive electrode 310 and the second positive electrode 320. The second diode 344 permits current to flow in a second direction (e.g., reverse to the first direction) in a second operational state of the electrochemical cell 300, for example, during discharging. The first positive electrode 310 and the second positive electrode 320 are electrically connected in parallel with one another. Further, the first diode 342 and the second diode 344 are in electrical connection with the first positive electrode 310 and the second positive electrode 320. The first positive electrode 310, second positive electrode 320, the first diode 342, and the second diode 344 are electrically connected to positive terminal 346. Each of the third negative electrodes 330 is also connected in parallel with one another that are connected to a negative terminal 348.

As described above, in a first operational state of the hybrid lithium-ion electrochemical cell corresponding to charging, the first diode 342 is configured to induce a voltage drop corresponding to the predetermined voltage difference in the first operational state, which generally corresponds to the predetermined voltage difference between the first maximum operational voltage of the first positive electroactive material in the first positive electrode 310 and the second maximum operational voltage of the second positive electroactive material in the second positive electrode 320. In a second operational state corresponding to discharging, the second diode 344 permits current to flow in an opposite or reverse direction to the first direction. In certain aspects, the second diode 344 is selected to have a minimal voltage drop that is less than the voltage drop of the first diode 342.

FIG. 7B shows a stack 350 of a plurality of assembled hybrid lithium-ion electrochemical cells like the hybrid lithium-ion electrochemical cell 300 in FIG. 7A, where the positive electrodes are connected in parallel and the negative electrodes are likewise connected in parallel. For brevity, the same reference numerals are used in FIG. 7B for common components shown in FIG. 7A and unless otherwise discussed, function in the same manner. Further, for ease of view, FIG. 7B omits the separators and electrolyte that are present between respective electrodes of opposite polarity in the stack 350.

The stack 350 includes a plurality of first positive electrodes 310 and a plurality of second positive electrodes all electrically connected together in parallel via electrical connection of the first and second current collectors 312, 322 with a first electrical conduit 352, which may include conductive terminals and wiring that is welded together. The plurality of first positive electrodes 310 and the plurality of second positive electrodes 320 are further in electrical communication and wired with the first diode 342 and the second diode 344, which are all electrically connected to positive terminal 346. As appreciated by those of skill in the art, the first diode 342 and the second diode 344 may be included internally within the stack 350 or external to the stack 350, but in electrical connection with the appropriate electrodes and terminal.

The stack 350 also includes a plurality of third negative electrodes 330, all electrically connected together in parallel via the third current collector 332 to a second electrical conduit 354, which may include terminals and conductive wiring that is welded together. While most of the plurality of third negative electrodes 330 are bilayer electrodes, in the stack 350, there are two terminal negative electrodes 356 that include a current collector 332 with only a single negative electroactive material layer 334 along one side that faces the opposite electrode (either first positive electrode 310 or second positive electrode 320).

While not specifically illustrated, it will be appreciated that the design of the hybrid lithium-ion electrochemical cell like that in FIGS. 7A-7B can be modified so that the pair of voltage modification devices are provided for two distinct negative electrodes rather than two distinct positive electrodes as in the case of the hybrid lithium-ion electrochemical cell 300 shown. Thus, a first diode and a second diode may be in electrical communication with a first negative electrode having a first negative electroactive material with a first minimum operational voltage and a distinct second negative electroactive material with a second distinct minimum operational voltage that define a predetermined voltage difference, so that the first diode provides a voltage drop that corresponds to the predetermined voltage difference in either the first operational state corresponding to charging and/or the second operational state corresponding to discharging of the electrochemical cell.

Figure 8A:
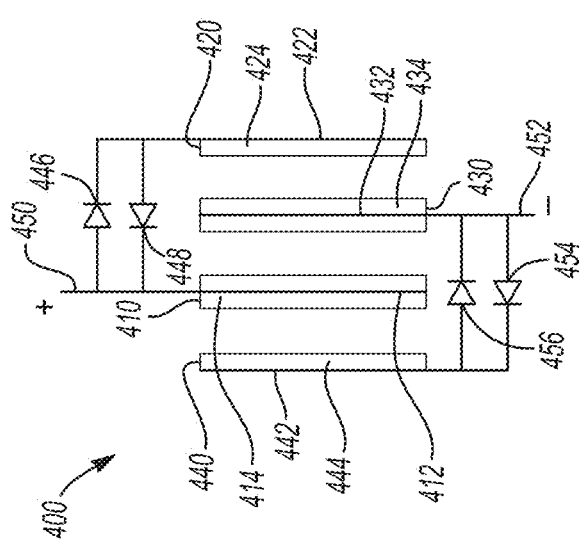
Figure 8B:
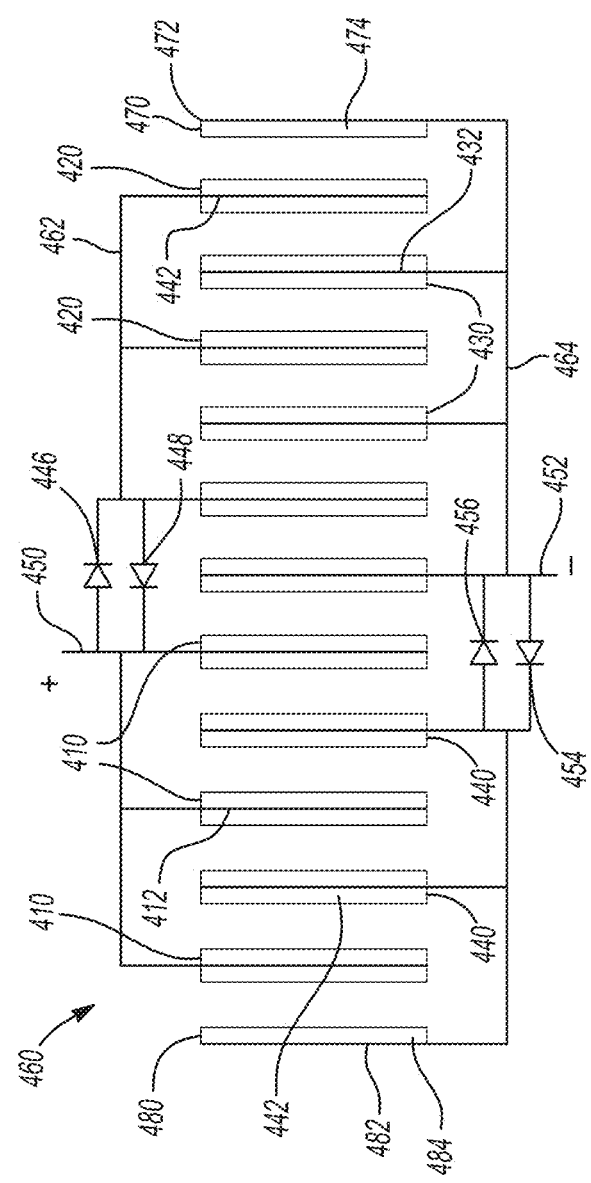

FIG. 8A shows another variation of a hybrid lithium-ion electrochemical cell 400 that cycles lithium ions prepared in accordance with certain aspects of the present disclosure, similar to that in FIG. 7A. However, in addition to two diodes connected to two distinct parallel positive electrodes like the design in FIG. 7A, the electrochemical cell 400 in FIG. 8A also has two additional voltage modification components or diodes electrically connected to the negative electrodes. FIG. 8B shows a stack 460 including a plurality of hybrid lithium-ion electrochemical cells like those in FIG. 8A having a plurality of distinct positive electrodes and voltage modification components connected in parallel, as well as a plurality of distinct negative electrodes and voltage modification components connected in parallel. For simplicity, FIGS. 8A-8B omit separators and electrolyte that will be disposed between electrodes of opposite polarity, as appreciated by those of skill in the art.

In FIG. 8A, the hybrid lithium-ion electrochemical cell 400 has a first positive electrode 410 having a first polarity (e.g., a positive polarity or cathode). The first positive electrode 410 includes a current collector 412. The first positive electrode 410 is a bilayer design that includes two first positive electroactive material layers 414 on opposite sides of the current collector 412. Each first positive electroactive material layer 414 comprises a first positive electroactive material that reversibly cycles lithium ions.

The electrochemical cell 400 also includes a second positive electrode 420. The second positive electrode 420 has a first polarity like the first positive electrode 410. The second positive electrode 420 includes a current collector 422. The second positive electrode 420 also includes a second positive electroactive material layer 424 that comprises a second positive electroactive material that reversibly cycles lithium ions and has a second maximum operational voltage that is less than a first maximum operational voltage of the first positive electroactive material in the first positive electrode 410.

The electrochemical cell 400 also includes third negative electrodes 430 (e.g., an anode) having a negative polarity. The third negative electrode 430 includes a third current collector 432. The third negative electrode 430 is a bilayer design that includes two first negative electroactive material layers 434 that respectively comprise a first negative electroactive material that reversibly cycles lithium ions and has a third electrochemical potential. The third negative electroactive material layers 434 are disposed on opposite sides of the current collector 432.

In this variation, the electrochemical cell 400 includes two distinct negative electrodes with distinct negative electroactive materials. Hence, the electrochemical cell 400 also includes a fourth negative electrode 440. The fourth negative electrode 440 has a second polarity like the third negative electrode 430. The fourth negative electrode 440 includes a fourth current collector 442. The fourth negative electrode 440 also includes a second negative electroactive material layer 444 that comprises a second negative electroactive material that reversibly cycles lithium ions. In certain aspects, the fourth electroactive material has a fourth electrochemical potential different from the third electrochemical potential of the first negative electroactive material in the third negative electrode 330.

In the hybrid lithium-ion electrochemical cell 400, four distinct voltage modification components are provided, a first pair in electrical communication with the first positive electrode 410 and the second positive electrode 420 and a second pair in electrical communication with the third negative electrode 430 and the fourth negative electrode 440. As shown in FIGS. 8A-8B, a first voltage modification component in the form of a first diode 446 is electrically connected to the first positive electrode 410 and the second positive electrode 420 that facilitates current flow in a first direction in a first operational state of the electrochemical cell 400, for example, during charging. A second voltage modification component in the form of a second diode 448 is also electrically connected to the first positive electrode 410 and the second positive electrode 420. The second diode 448 permits current to flow in a second direction (e.g., reverse to the first direction) in a second operational state of the electrochemical cell 400, for example, during discharging. The first positive electrode 410 and the second positive electrode 420 are electrically connected in parallel with one another. Further, the first diode 446 and the second diode 448 are in electrical connection with the first positive electrode 410 and the second positive electrode 420. The first positive electrode 410, second positive electrode 420, the first diode 446, and the second diode 448 are electrically connected to positive terminal 450.

A first predetermined voltage difference is defined between a first maximum operational voltage of the first positive electroactive material of the first positive electrode 410 and a second maximum operational voltage of the second positive electroactive material of the second positive electrode 420. As described above, in a first operational state of the hybrid lithium-ion electrochemical cell 400 corresponding to charging, the first diode 446 is configured to induce a voltage drop corresponding to the first predetermined voltage difference. In a second operational state corresponding to discharging, the second diode 448 permits current to flow in an opposite or reverse direction to the first direction.

The third negative electrode 430 and the fourth negative electrode 440 are also electrically connected in parallel with one another and to a negative terminal 452. A third voltage modification component in the form of a third diode 454 is electrically connected to the third negative electrode 430 and the fourth negative electrode 440 that facilitates current flow in a first direction in a second operational state of the electrochemical cell 400, for example, during discharging. A third voltage modification component in the form of a fourth diode 456 is also electrically connected to the third negative electrode 430 and the fourth negative electrode 440. The fourth diode 456 permits current to flow in a second direction (e.g., reverse to the first direction) in a first operational state of the electrochemical cell 400, for example, during charging. The third diode 454 and the fourth diode 456 are in electrical connection with the third negative electrode 430 and the fourth negative electrode 440. The third negative electrode 430, fourth negative electrode 440, the third diode 454, and the fourth diode 456 are electrically connected to negative terminal 452.

A second predetermined voltage difference is defined between a first minimum operational voltage of the first negative electroactive material of the third negative electrode 430 and a second minimum operational voltage of the second negative electroactive material of the fourth negative electrode 440. As described above, in a second operational state of the hybrid lithium-ion electrochemical cell 400 corresponding to discharging, the third diode 454 is configured to permit current to flow. In a first operational state corresponding to charging, the fourth diode 456 permits current to flow in an opposite or reverse direction to the first direction and induce a voltage drop corresponding to the second predetermined voltage difference.

FIG. 8B shows a stack 460 of a plurality of assembled hybrid lithium-ion electrochemical cells like the hybrid lithium-ion electrochemical cell 400 in FIG. 8A, where the positive electrodes are distinct from one another and connected in parallel and the negative electrodes are likewise distinct from one another and connected in parallel. For brevity, the same reference numerals are used in FIG. 8B for common components shown in FIG. 8A and unless otherwise discussed, function in the same manner. The stack 460 includes a plurality of first positive electrodes 410 and a plurality of second positive electrodes 420 all electrically connected together in parallel via the first and second current collectors 412, 422 to a first electrical conduit 442, which may include conductive terminals and wiring welded together. Further, the plurality of first positive electrodes 410 and the plurality of second positive electrodes 420 are in electrical communication and wired with the first diode 446 and the second diode 448, again which are in electrical communication with the positive terminal 450. As appreciated by those of skill in the art, the first diode 446 and the second diode 448 may be included internally within the stack 460 or external to the stack 460, but in electrical connection with the appropriate electrodes and terminal(s).

The stack 460 also includes a plurality of third negative electrodes 430 and a plurality of fourth negative electrodes 440 all electrically connected together in parallel via of the third and fourth current collectors 432, 442 with a second electrical conduit 462, which may be conductive wiring that is welded together. Further, the plurality of third negative electrodes 430 and the plurality of fourth negative electrodes 440 are in electrical communication and wired with the third diode 454 and the fourth diode 456, all of which are in electrical communication with the negative terminal 452. As appreciated by those of skill in the art, the first diode 446 and the second diode 448 may be included internally within the stack 460 or external to the stack 460, but in electrical connection with the appropriate electrodes and terminal(s). As appreciated by those of skill in the art, the third diode 454 and the fourth diode 456 may be included internally within the stack 460 or external to the stack 460, but in electrical connection with the appropriate electrodes and terminal(s). While most of the plurality of third negative electrodes 430 are bilayer electrodes, in the stack 460, there is a terminal third negative electrode 470 that includes a current collector 472 with only a single first negative electroactive material layer 474 along one side that faces the opposite electrode (second positive electrode 420). There is also a terminal fourth negative electrode 480 that includes a current collector 482 with only a single second negative electroactive material layer 484 along one side that faces the opposite electrode (first positive electrode 410). The stack 460 has a plurality of assembled hybrid lithium-ion electrochemical cells with both positive electrodes in parallel and negative electrodes in parallel. In this manner, the stack 460 also includes voltage modification devices that not only compensate for a first predetermined voltage difference corresponding to differences in maximum operational voltages for different positive electroactive materials in distinct positive electrodes, but also compensate for a second predetermined voltage difference corresponding to differences in minimum operational voltages for different negative electroactive materials in distinct negative electrodes.

Figure 9A:
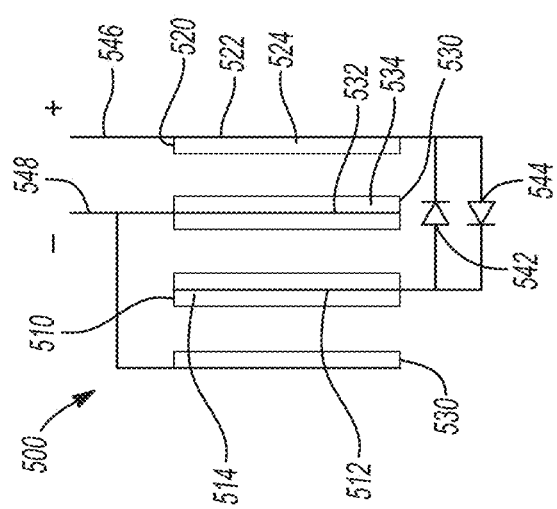
Figure 9B:
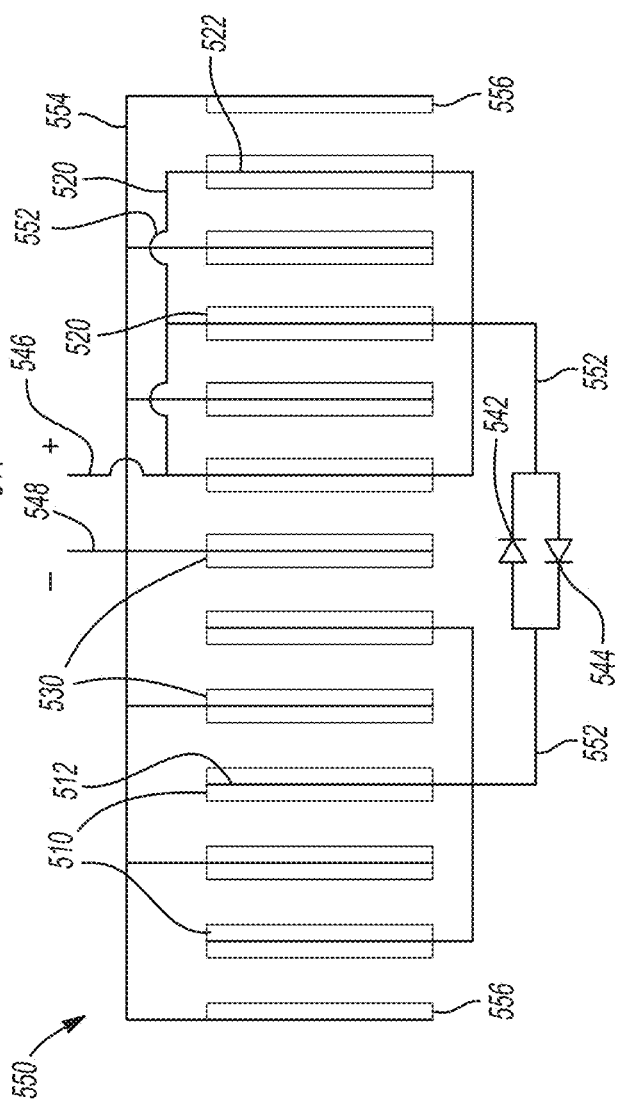

FIGS. 9A-9B shows another variation of a hybrid lithium-ion electrochemical cell that cycles lithium ions. FIG. 9A shows a single hybrid lithium-ion electrochemical cell 500 including two distinct positive electrodes connected in series along with two voltage modification components prepared in accordance with certain aspects of the present disclosure. FIG. 9B shows a stack 550 including a plurality of hybrid lithium-ion electrochemical cells like those in FIG. 9A having a plurality of distinct positive electrodes and voltage modification components connected in series. In FIG. 9A, the hybrid lithium-ion electrochemical cell 500 has a first positive electrode 510 having a first polarity (e.g., a positive polarity or cathode). The first positive electrode 510 includes a current collector 512. The first positive electrode 510 is a bilayer design that includes two first positive electroactive material layers 514 on opposite sides of the current collector 512. Each first positive electroactive material layer 514 comprises a first positive electroactive material that reversibly cycles lithium ions and has a first maximum operational voltage.

The electrochemical cell 500 also includes a second positive electrode 520. The second positive electrode 520 has a first polarity like the first positive electrode 510. The second positive electrode 520 includes a current collector 522. The second positive electrode 520 also includes a second positive electroactive material layer 524 that comprises a second positive electroactive material that reversibly cycles lithium ions and has a second maximum operational voltage is distinct from the first positive electroactive material in the first positive electrode 510. While the design in FIG. 9A has only a single second positive electroactive material layer 524, it should be noted that while not shown, this electrode may likewise be modified to be a bilayer design where two distinct second positive electroactive material layers 524 are disposed on opposite sides of the current collector 522.

The electrochemical cell 500 also includes two third negative electrodes 530 (e.g., an anode) having a negative polarity. Each third negative electrode 530 includes a current collector 532. The third negative electrode 530 may be a bilayer design that includes two negative electroactive material layers 534 that respectively comprise a third negative electroactive material that reversibly cycles lithium ions and has a third electrochemical potential. Each distinct third negative electroactive material layer 534 is disposed on a single or opposite sides of the current collector 532. Each third negative electrode 530 is connected in parallel in the electrochemical cell 500. Further, for ease of view, FIGS. 9A-9B omit separators and electrolyte that are present between respective electrodes of opposite polarity in the stack 550, as previously shown in FIGS. 3A and 7A, by way of example.

In the hybrid lithium-ion electrochemical cell 500, two voltage modification components are provided in electrical communication with the first positive electrode 510 and the second positive electrode 520. As shown in FIGS. 9A-9B, a first voltage modification component in the form of a first diode 542 is electrically connected to the first positive electrode 510 and the second positive electrode 520 that facilitates current flow in a first direction in a second operational state of the electrochemical cell 500, for example, during discharging. A second voltage modification component in the form of a second diode 544 is also electrically connected to the first positive electrode 510 and the second positive electrode 520. The second diode 544 permits current to flow in a second direction (e.g., reverse to the first direction) in a first operational state of the electrochemical cell 500, for example, during charging.

The first positive electrode 510 and the second positive electrode 520 are electrically connected in series with one another. Further, the first diode 542 and the second diode 544 are in electrical connection with the first positive electrode 510 and the second positive electrode 520. More specifically, the first diode 542 is disposed between the first positive electrode(s) 510 and the second positive electrode(s) 520 that are connected in series. Likewise, the second diode 544 is disposed between the first positive electrode 510 and the second positive electrode 520 in serial connection with one another. The first positive electrode 510, second positive electrode 520, the first diode 542, and the second diode 544 are electrically connected to positive terminal 546. Each of the third negative electrodes 530 is also electrically connected in parallel with one another and further are connected to a negative terminal 548.

As described above, in a first operational state of the hybrid lithium-ion electrochemical cell corresponding to charging, the second diode 544 is configured to induce a voltage drop corresponding to the predetermined voltage difference in the second operational state, which generally corresponds to the predetermined voltage difference between the first maximum operational voltage of the first positive electroactive material in the first positive electrode 510 and the second maximum operational voltage of the second positive electroactive material in the second positive electrode 520. In a second operational state corresponding to discharge, the first diode 542 permits current to flow in an opposite or reverse direction to the first direction.

FIG. 9B shows a stack 550 of a plurality of assembled hybrid lithium-ion electrochemical cells like the hybrid lithium-ion electrochemical cell 300 in FIG. 9A, where the positive electrodes are connected in series and the negative electrodes are connected in parallel. For brevity, the same reference numerals are used in FIG. 9B for common components shown in FIG. 9A and unless otherwise discussed, function in the same manner. Further, for ease of view, FIG. 9B omits the separators and electrolyte that are present between respective electrodes of opposite polarity in the stack 550.

The stack 550 includes a plurality of first positive electrodes 510 and a plurality of second positive electrodes 520 all electrically connected together in series via electrical connection of the first and second current collectors 512, 522 with a first electrical conduit 552, which may include conductive terminals and wiring that is welded together. The plurality of first positive electrodes 510 and the plurality of second positive electrodes 520 are further in electrical communication and wired with the first diode 542 and the second diode 544, which are all electrically connected to positive terminal 546. As appreciated by those of skill in the art, the first diode 542 and the second diode 544 may be included internally within the stack 550 or external to the stack 550, but in electrical connection with the appropriate electrodes and terminal.

The stack 550 also includes a plurality of third negative electrodes 530, all electrically connected together in series via the third current collector 532 to a second electrical conduit 554, which may include terminals and conductive wiring that is welded together. While most of the plurality of third negative electrodes 530 are bilayer electrodes, in the stack 550, there are two terminal negative electrodes 556 that include a current collector 532 with only a single negative electroactive material layer 534 along one side that faces the opposite electrode (either first positive electrode 510 or second positive electrode 520).

While not specifically illustrated, it will be appreciated that the design of the hybrid lithium-ion electrochemical cell like that in FIGS. 9A-9B can be modified so that the pair of voltage modification devices are provided for two distinct negative electrodes rather than two distinct positive electrodes as in the case of the hybrid lithium-ion electrochemical cell 500 shown. Thus, a first diode and a second diode may be in electrical communication with a first negative electrode having a first negative electroactive material with a first minimum operational voltage and a second negative electroactive material with a second minimum operational voltage that define a predetermined voltage difference, so that the first diode and/or second diode provides a voltage drop that corresponds to the predetermined voltage difference in either the first operational state corresponding to charging and/or the second operational state corresponding to discharging of the electrochemical cell. The first negative electrode and the second negative electrode may be electrically connected in series.

Figure 10A:
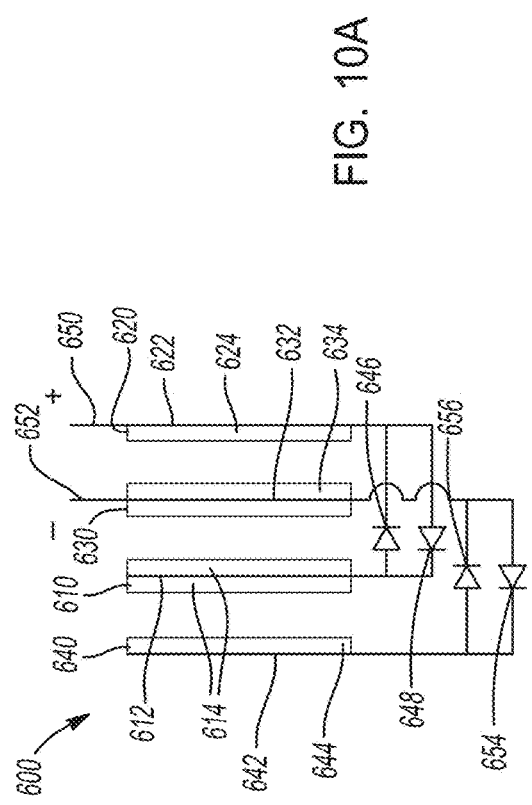
Figure 10B:
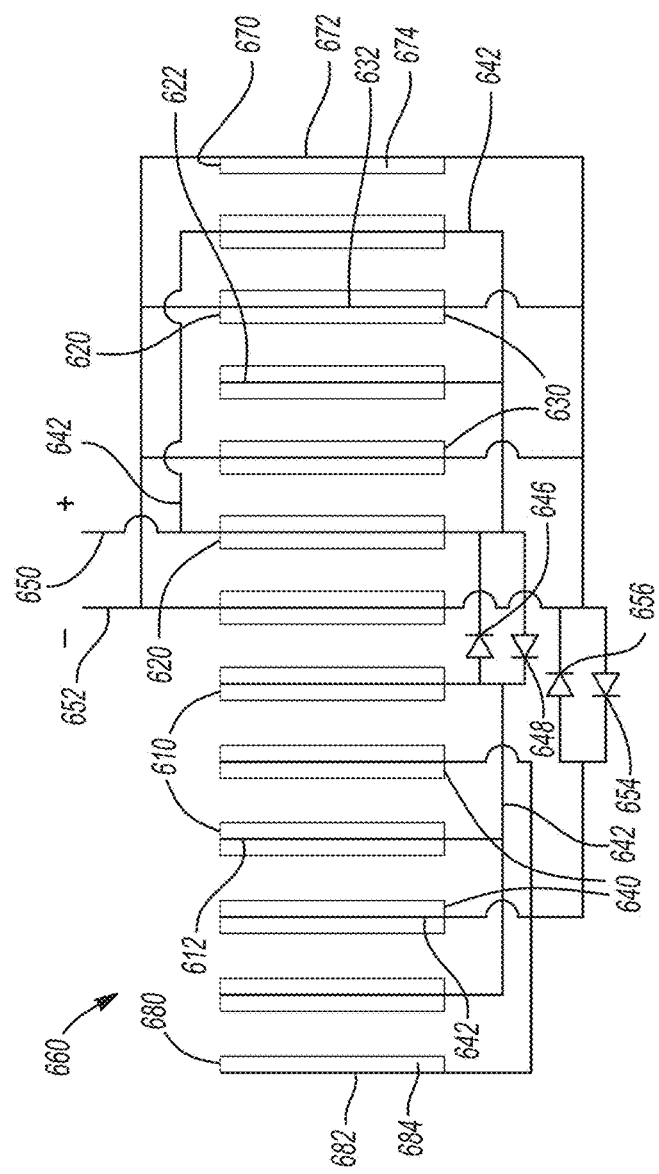

FIG. 10A shows another variation of a hybrid lithium-ion electrochemical cell 600 that cycles lithium ions prepared in accordance with certain aspects of the present disclosure, similar to that in FIG. 9A. However, in addition to two diodes connected to two distinct series positive electrodes like the design in FIG. 9A, the electrochemical cell 600 in FIG. 10A also has two additional voltage modification components or diodes electrically connected to the negative electrodes that are also connected in series. Thus, FIG. 10B shows a stack 660 including a plurality of hybrid lithium-ion electrochemical cells like those in FIG. 10A having a plurality of distinct positive electrodes and voltage modification components connected in series, as well as a plurality of distinct negative electrodes and voltage modification components connected in series. For simplicity, FIGS. 10A-10B omit separators and electrolyte that will be disposed between electrodes of opposite polarity, as appreciated by those of skill in the art.

In FIG. 10A, the hybrid lithium-ion electrochemical cell 600 has a first positive electrode 610 having a first polarity (e.g., a positive polarity or cathode). The first positive electrode 610 includes a current collector 612. The first positive electrode 610 is a bilayer design that includes two first positive electroactive material layers 614 on opposite sides of the current collector 612. Each first positive electroactive material layer 614 comprises a first positive electroactive material that reversibly cycles lithium ions and has a first maximum operational voltage.

The electrochemical cell 600 also includes a second positive electrode 620. The second positive electrode 620 has a first polarity like the first positive electrode 610. The second positive electrode 620 includes a current collector 622. The second positive electrode 620 also includes a second positive electroactive material layer 624 that comprises a second positive electroactive material that reversibly cycles lithium ions and has a second maximum operational voltage distinct from the first maximum operational voltage of the first positive electroactive material in the first positive electrode 610.

The electrochemical cell 600 also includes third negative electrodes 630 (e.g., an anode) having an opposite or negative polarity. The third negative electrode 630 includes a third current collector 632. The third negative electrode 630 is a bilayer design that includes two first negative electroactive material layers 634 that respectively comprise a first negative electroactive material that reversibly cycles lithium ions and has a first minimum operational voltage. The third negative electroactive material layers 634 are disposed on opposite sides of the current collector 632.

In this variation, the electrochemical cell 600 includes two distinct negative electrodes with distinct negative electroactive materials having distinct minimum operational voltages. Hence, the electrochemical cell 600 also includes a fourth negative electrode 640. The fourth negative electrode 640 has a second polarity like the third negative electrode 630. The fourth negative electrode 640 includes a fourth current collector 642. The fourth negative electrode 640 also includes a second negative electroactive material layer 644 that comprises a second negative electroactive material that reversibly cycles lithium ions and has a second minimum operational voltage different from the first minimum operational voltage of the first negative electroactive material in the third negative electrode 630.

In the hybrid lithium-ion electrochemical cell 600, four distinct voltage modification components are provided, a first pair in electrical communication with the first positive electrode 610 and the second positive electrode 620 and a second pair in electrical communication with the third negative electrode 630 and the fourth negative electrode 640. As shown in FIGS. 10A-10B, a first voltage modification component in the form of a first diode 646 is electrically connected to the first positive electrode 610 and the second positive electrode 620 that facilitates current flow in a first direction in a second operational state of the electrochemical cell 600, for example, during discharging. A second voltage modification component in the form of a second diode 648 is also electrically connected to the first positive electrode 610 and the second positive electrode 620. The second diode 648 permits current to flow in a second direction (e.g., reverse to the first direction) in a first operational state of the electrochemical cell 600, for example, during charging. The first positive electrode 610 and the second positive electrode 620 are electrically connected in series with one another. Further, the first diode 646 and the second diode 648 are in electrical connection with the first positive electrode 610 and the second positive electrode 620. More specifically, the first diode 646 is disposed between the first positive electrode 610 and the second positive electrode 620 that are connected in series. Likewise, the second diode 648 is disposed between the first positive electrode 610 and the second positive electrode 620 in serial connection with one another. The first positive electrode 610, second positive electrode 620, the first diode 646, and the second diode 648 are electrically connected to positive terminal 650.

A first predetermined voltage difference is defined between a first maximum operational voltage of the first positive electroactive material of the first positive electrode 610 and a second maximum operational voltage of the second positive electroactive material of the second positive electrode 620. As described above, in a first operational state of the hybrid lithium-ion electrochemical cell 600 corresponding to charging, the second diode 648 is configured to induce a voltage drop corresponding to the first predetermined voltage difference. In a second operational state corresponding to discharging, the first diode 646 permits current to flow in an opposite or reverse direction to the first direction.

The third negative electrode 630 and the fourth negative electrode 640 are also electrically connected in series with one another and to a negative terminal 652. A third voltage modification component in the form of a third diode 654 is electrically connected to the third negative electrode 630 and the fourth negative electrode 640 that facilitates current flow in a first direction in a second operational state of the electrochemical cell 600, for example, during discharging. A fourth voltage modification component in the form of a fourth diode 656 is also electrically connected to the third negative electrode 630 and the fourth negative electrode 640. The fourth diode 656 permits current to flow in a second direction (e.g., reverse to the first direction) in a first operational state of the electrochemical cell 600, for example, during charging. The third diode 654 and the fourth diode 656 are in electrical connection with the third negative electrode 630 and the fourth negative electrode 640. More specifically, the third diode 654 is disposed between the first positive electrode 610 and the second positive electrode 620 that are connected in series. Likewise, the fourth diode 656 is disposed between the first positive electrode 610 and the second positive electrode 620 in serial connection with one another. The third negative electrode 630, fourth negative electrode 640, the third diode 654, and the fourth diode 656 are electrically connected to negative terminal 652.

A second predetermined voltage difference is defined between a first minimum operational voltage of the first negative electroactive material of the third negative electrode 630 and a second minimum operational voltage of the second negative electroactive material of the fourth negative electrode 640. As described above, in a first operational state of the hybrid lithium-ion electrochemical cell 600 corresponding to charging, the fourth diode 656 is configured to induce a voltage drop corresponding to the second predetermined voltage difference. In the second operational state of the hybrid lithium-ion electrochemical cell 600 corresponding to discharging, the third diode 654 permits current to flow.

FIG. 10B shows a stack 660 of a plurality of assembled hybrid lithium-ion electrochemical cells like the hybrid lithium-ion electrochemical cell 600 in FIG. 10A, where the positive electrodes are distinct from one another and connected in series and the negative electrodes are likewise distinct from one another and connected in series. For brevity, the same reference numerals are used in FIG. 10B for common components shown in FIG. 10A and unless otherwise discussed, function in the same manner. The stack 660 includes a plurality of first positive electrodes 610 and a plurality of second positive electrodes 620 all electrically connected together in series via the first and second current collectors 612, 622 to a first electrical conduit 642, which may include conductive terminals and wiring welded together. Further, the plurality of first positive electrodes 610 and the plurality of second positive electrodes 620 are in electrical communication and wired with the first diode 646 and the second diode 648, again which are in electrical communication with the positive terminal 650. As appreciated by those of skill in the art, the first diode 646 and the second diode 648 may be included internally within the stack 660 or external to the stack 660, but in electrical connection with the appropriate electrodes and terminal(s).

The stack 660 also includes a plurality of third negative electrodes 630 and a plurality of fourth negative electrodes 640 all electrically connected together in series via of the third and fourth current collectors 632, 642 with a second electrical conduit 662, which may be conductive wiring that is welded together. Further, the plurality of third negative electrodes 630 and the plurality of fourth negative electrodes 640 are in electrical communication and wired with the third diode 654 and the fourth diode 656, all of which are in electrical communication with the negative terminal 652. As appreciated by those of skill in the art, the third diode 654 and the fourth diode 656 may be included internally within the stack 660 or external to the stack 660, but in electrical connection with the appropriate electrodes and terminal(s). While most of the plurality of third negative electrodes 630 are bilayer electrodes, in the stack 660, there is a terminal third negative electrode 670 that includes a current collector 672 with only a single first negative electroactive material layer 674 along one side that faces the opposite electrode (second positive electrode 620). A terminal fourth negative electrode 680 includes a current collector 682 with only a single second negative electroactive material layer 684 along one side that faces the opposite electrode (first positive electrode 610). The stack 660 has a plurality of assembled hybrid lithium-ion electrochemical cells with both positive electrodes in series and negative electrodes in series. In this manner, the stack 660 also includes voltage modification devices that not only compensate for a first predetermined voltage difference corresponding to differences in maximum operational voltages for different positive electroactive materials in distinct positive electrodes, but also compensate for a minimum operational voltages corresponding to differences in electrochemical potential for different negative electroactive materials in distinct negative electrodes.

Figure 11:
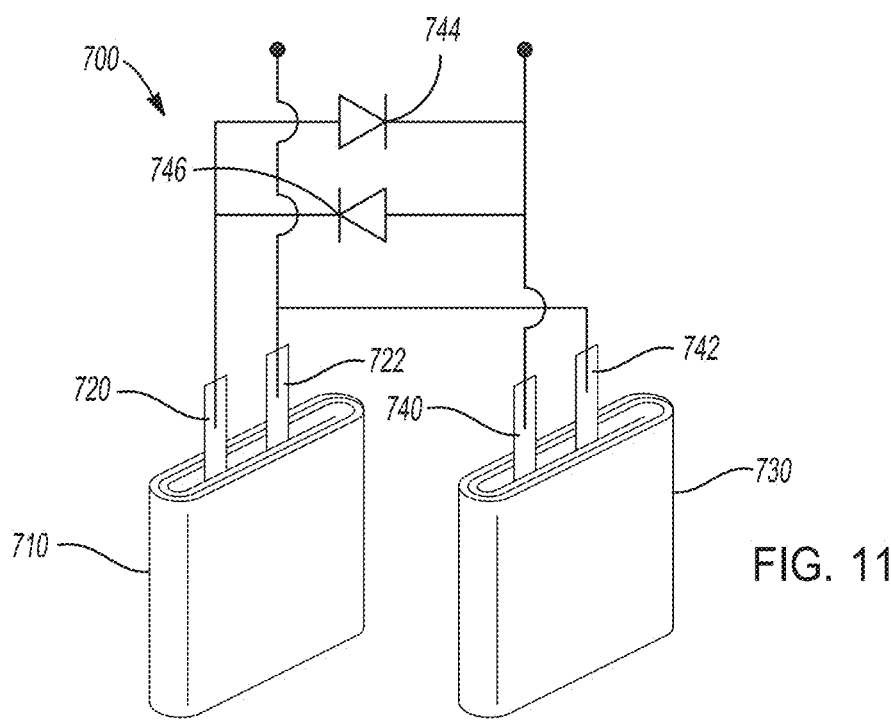
FIG. 11 shows an electrochemical device including a hybrid lithium-ion electrochemical core cell assembly prepared in accordance with certain variations of the present disclosure incorporating two distinct cell cores having distinct positive electrodes and voltage modification components.

FIG. 11 shows yet another variation of an electrochemical device 700 including a hybrid lithium-ion electrochemical core cell assembly prepared in accordance with certain variations of the present disclosure, incorporating two distinct cell cores having distinct positive electrodes. A first cell core 710 includes a plurality of lithium-ion electrochemical cells defining a plurality of negative electrodes, a plurality of first positive electrodes, separators, and having electrolyte and the like. As shown, the cell core 710 has a jellyroll configuration, although the cell core can be fabricated by stacking (as previously described, winding stacking, and the like. In this design, the first cell core 710 has a first positive electrode having a first positive electroactive material with a first maximum operational voltage. The plurality of internal positive electrodes are electrically connected to a first positive terminal 720. The first cell core 710 also has a negative electrode comprising a negative electroactive material. The plurality of internal negative electrodes are electrically connected to a first negative terminal 722.

A second cell core 730 includes a plurality of lithium-ion electrochemical cells defining a plurality of negative electrodes, a plurality of second positive electrodes, separators, and having electrolyte and the like. As shown, the cell core 730 has a jellyroll configuration, but again may have other configurations. The second cell core 730 has a second positive electrode having a second positive electroactive material with a second maximum operational voltage. The first maximum operational voltage of the first positive electroactive material and the second maximum operational voltage of the second positive electroactive material define a predetermined voltage difference. The plurality of internal second positive electrodes are electrically connected to a second positive terminal 740. The second cell core 730 also has a negative electrode comprising the same negative electroactive material as the negative electrodes in the first cell core 710. The plurality of internal negative electrodes are electrically connected to a second negative terminal 742. The first positive terminal 720 and the second positive terminal 740 are electrically connected to one another. Further, the first negative terminal 722 and the second negative terminal 742 are electrically connected to one another.

External to the first cell core 710 and the second cell core 730 is a first voltage modification component in the form of a first diode 744. The first diode 744 is electrically connected to the first cathode terminal 720 and the second cathode terminal 740. The first diode 744 facilitates current flow in a first direction in a second operational state of an electrochemical device 700, for example, during discharging. A second voltage modification component in the form of a second diode 746 is also electrically connected to the first cathode terminal 720 and the second cathode terminal 740. The second diode 746 permits current to flow in a second direction (e.g., reverse to the first direction) in a first operational state of the electrochemical device 700, for example, during charging. As described above, in a first operational state of the electrochemical device 700 corresponding to charging, the second diode 746 is configured to induce a voltage drop corresponding to the predetermined voltage difference between positive electroactive materials. In a second operational state corresponding to discharging, the first diode 744 permits current to flow in an opposite or reverse direction to the first direction.

Figure 12:
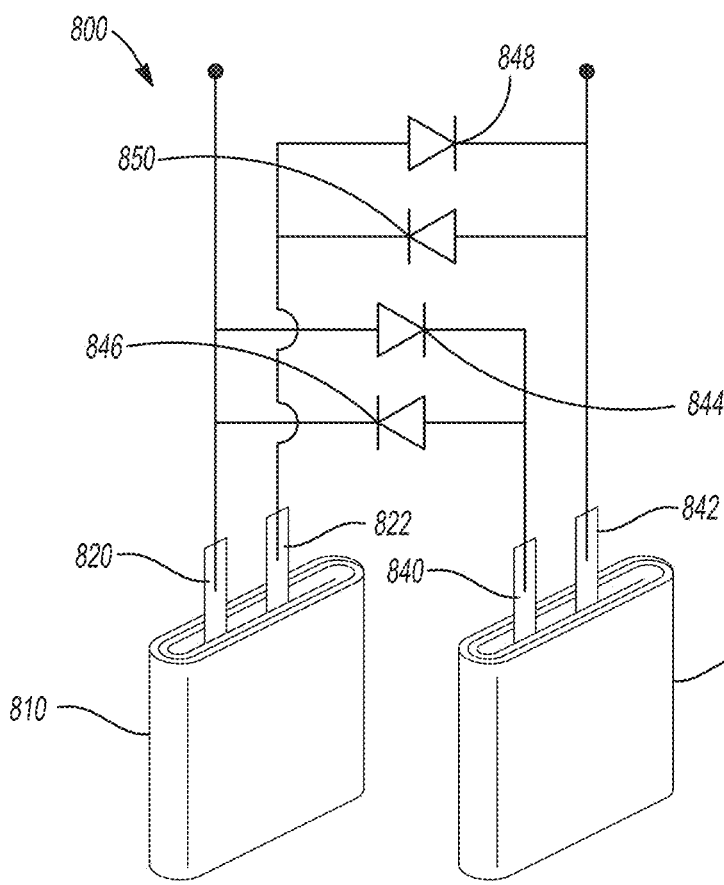
FIG. 12 shows yet another electrochemical device including a hybrid lithium-ion electrochemical core cell assembly prepared in accordance with certain variations of the present disclosure incorporating two distinct cell cores having distinct positive and negative electrodes and voltage modification components.

FIG. 12 shows yet another variation of an electrochemical device 800 including a hybrid lithium-ion electrochemical core cell assembly prepared in accordance with certain variations of the present disclosure, incorporating two distinct cell cores having distinct positive electrodes and distinct negative electrodes. A first cell core 810 includes a plurality of lithium-ion electrochemical cells defining a plurality of first positive electrodes, a plurality of first negative electrodes, separators, and having electrolyte and the like. As shown, the cell core 810 has a jellyroll configuration, although the cell core can be fabricated by stacking, winding stacking, and the like. The first cell core 810 has a first positive electrode having a first positive electroactive material with a first maximum operational voltage. The plurality of internal positive electrodes are electrically connected to a first positive terminal 820. The first cell core 810 also has a first negative electrode comprising a first negative electroactive material. The first negative electroactive material has a first minimum operational voltage. The plurality of internal first negative electrodes are electrically connected to a second negative terminal 822.

A second cell core 830 includes a plurality of lithium-ion electrochemical cells defining a plurality of second negative electrodes, a plurality of second positive electrodes, separators, and having electrolyte and the like. Again, the cell core 830 has a representative jellyroll configuration, but may have other designs. The second cell core 830 has a second positive electrode having a second positive electroactive material with a second maximum operational voltage. The first maximum operational voltage of the first positive electroactive material and the second maximum operational voltage of the second positive electroactive material define a first predetermined voltage difference. The plurality of internal second positive electrodes are electrically connected to a second positive terminal 840. The second cell core 830 also has a second negative electrode comprising a second negative electroactive material having a second minimum operational voltage. The first minimum operational voltage of the first negative electroactive material and the second minimum operational voltage of the second negative electroactive material define a second predetermined voltage difference. The plurality of internal second negative electrodes are electrically connected to a second negative terminal 842. The first positive terminal 820 and the second positive terminal 840 are electrically connected to one another. Further, the first negative terminal 822 and the second negative terminal 842 are electrically connected to one another.

External to the first cell core 810 and the second cell core 830 is a first voltage modification component in the form of a first diode 844. The first diode 844 is electrically connected to the first positive terminal 820 and the second positive terminal 840. The first diode 844 facilitates current flow in a first direction in a first operational state of an electrochemical device 800, for example, during charging. A second voltage modification component in the form of a second diode 846 is also electrically connected to the first cathode terminal 820 and the second cathode terminal 840. The second diode 846 permits current to flow in a second direction (e.g., reverse to the first direction) in a second operational state of the electrochemical device 800, for example, during discharging. As described above, in a first operational state of the electrochemical device 800 corresponding to charging, the first diode 844 is configured to induce a voltage drop corresponding to the first predetermined voltage difference between positive electroactive materials. In a second operational state corresponding to discharging, the second diode 846 permits current to flow in an opposite or reverse direction to the first direction.

Also included is a third voltage modification component in the form of a third diode 848. The third diode 848 is electrically connected to the first anode terminal 822 and the second anode terminal 842. The third diode 848 facilitates current flow in a first direction in a first operational state of an electrochemical device 800, for example, during charging. A second voltage modification component in the form of a fourth diode 850 is also electrically connected to the first anode terminal 822 and the second anode terminal 842. The fourth diode 850 permits current to flow in a second direction (e.g., reverse to the first direction) in a second operational state of the electrochemical device 800, for example, during discharging. As described above, in a first operational state of the electrochemical device 800 corresponding to discharging, the third diode 848 is configured to induce a voltage drop corresponding to the second predetermined voltage difference between negative electroactive materials. In a second operational state corresponding to discharging, the fourth diode 850 permits current to flow in an opposite or reverse direction to the first direction.

In this manner, lithium-ion electrochemical devices are provided that incorporate hybrid lithium-ion electrochemical cells having at least two different electroactive materials regardless of voltage mismatch, especially for transportation applications. As such, lithium-ion electrochemical cells are provided that have high-energy capacity and fast charging capabilities.

The various components of the lithium-ion electrochemical cells are further described herein. As described above, a typical lithium-ion battery includes a negative electrode, a positive electrode, and a porous separator (e.g., a microporous or nanoporous polymeric separator) disposed between the two electrodes. A negative electrode current collector may be positioned at or near the negative electrode and a positive electrode current collector may be positioned at or near the positive electrode. The negative electrode current collector and the positive electrode current collector may be coated on one or both sides, as is known in the art. In certain aspects, the current collectors may be coated with an active material/electrode layer on both sides. The negative electrode current collector and positive electrode current collector respectively collect and move free electrons to and from an interruptible external circuit, as described previously above, that connect a load to the negative electrode(s) (through its current collector) and the positive electrode (through its current collector).

The porous separator includes an electrolyte, which may also be present in the negative electrode and positive electrode. Any appropriate electrolyte, whether in solid form or solution, capable of conducting lithium ions between the negative electrode and the positive electrode may be used in the lithium-ion battery. In certain aspects, the electrolyte may be a non-aqueous liquid electrolyte solution that includes a lithium salt dissolved in an organic solvent or a mixture of organic solvents. Numerous conventional non-aqueous liquid electrolyte solutions may be employed in the lithium-ion battery. A non-limiting list of lithium salts that may be dissolved in an organic solvent to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium bis-(oxalate)borate ($LiB(C_2O_4)_2$) (LiBOB); lithium hexafluoroarsenate ($LiAsF_6$); lithium trifluoromethanesulfonate ($LiCF_3SO_3$); bis(trifluoromethanesulfonimide) ($LiN(CF_3SO_2)_2$); lithium fluorosulfonylimide ($LiN(FSO_2)_2$); and combinations thereof.

These lithium salts may be dissolved in a variety of organic solvents, including but not limited to various alkyl carbonates, such as cyclic carbonates (e.g., ethylene carbonate (EC), propylene carbonate (PC), butylene carbonate (BC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), and combinations thereof.

In other variations, solid electrolytes can be used. This includes solid-polymer electrolyte, as well as solid ceramic-based electrolytes that conduct lithium ions. In certain solid electrolyte designs, no distinct separator component or binder may be necessary in the electrochemical cell. In designs with liquid electrolyte, the electrochemical cell includes a separator structure.

The porous separator operates as both an electrical insulator and a mechanical support, by being disposed between respective negative electrodes and positive electrodes to prevent physical contact and thus, the occurrence of a short circuit. The porous separator, in addition to providing a physical barrier between the electrodes, can provide a minimal resistance path for internal passage of lithium ions (and related anions) during cycling of the lithium ions to facilitate functioning of the lithium-ion battery.

The porous separator may include, in instances, a microporous polymeric separator including a polyolefin (including those made from a homopolymer (derived from a single monomer constituent) or a heteropolymer (derived from more than one monomer constituent)), which may be either linear or branched. In certain aspects, the polyolefin may be polyethylene (PE), polypropylene (PP), or a blend of PE and PP, or multi-layered structured porous films of PE and/or PP. Commercially available polyolefin porous separator membranes include CELGARD® 2500 (a monolayer polypropylene separator) and CELGARD® 2320 (a trilayer polypropylene/polyethylene/polypropylene separator) available from Celgard LLC.

When the porous separator is a microporous polymeric separator, it may be a single layer or a multi-layer laminate. For example, in one embodiment, a single layer of the polyolefin may form the entire microporous polymer separator. In other aspects, the separator may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator. The microporous polymer separator may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (such as polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF—hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, mesoporous silica, and/or combinations thereof.

Furthermore, the porous separator may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator are contemplated, as well as the many manufacturing methods that may be employed to produce such a microporous polymer separator.

In certain aspects, the positive electrode may be formed from a lithium-based active material that can sufficiently undergo lithium intercalation and deintercalation, absorption and desorption, or alloying and dealloying, while functioning as the positive terminal of the lithium-ion battery. The positive electrode may include a polymeric binder material to structurally fortify the lithium-based active material. The positive electrode electroactive materials may include one or more transition metals, such as manganese (Mn), nickel (Ni), cobalt (Co), chromium (Cr), iron (Fe), vanadium (V), and combinations thereof.

In certain variations, one or more positive electrodes may comprise a positive electroactive material that is a high energy capacity electroactive material. The one or more second positive electrodes may optionally comprise a high power capacity electroactive material. In other variations, the second positive electrode may comprise a distinct high energy capacity electroactive material layer. Each electroactive layer may include a polymeric binder and optionally a plurality of electrically conductive particles.

A high energy capacity electroactive positive material may have a specific capacity of greater than or equal to about 90 mAh/g, optionally greater than or equal to about 120 mAh/g, optionally greater than or equal to about 140 mAh/g, optionally greater than or equal to about 160 mAh/g, optionally greater than or equal to about 180 mAh/g, optionally greater than or equal to about 200 mAh/g, optionally greater than or equal to about 220 mAh/g, and in certain variations, optionally greater than or equal to about 250 mAh/g.

A high power capacity electroactive positive material may have a potential versus Li/Li+ of greater than or equal to about 1 V during lithium ion insertion and/or absorption, optionally a potential versus Li/Li+ of greater than or equal to about 1.5 V during lithium ion insertion and/or absorption.

Two exemplary, non-limiting, common classes of known high energy density electroactive materials that can be used to form the positive electrode are lithium transition metal oxides with layered structures and lithium transition metal oxides with a spinel phase. For example, in certain instances, the positive electrode may include a spinel-type transition metal oxide, like lithium manganese oxide ($Li_{(1+x)}Mn_{(2-x)}O_4$), where x is typically less than 0.15, including $LiMn_2O_4$ (LMO) and lithium manganese nickel oxide $LiMn_{1.5}Ni_{0.5}O_4$ (LMNO). In other instances, the positive electrode may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \le x \le 1$, $0 \le y \le 1$, $0 \le z \le 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used.

In certain aspects, the hybrid lithium-ion electrochemical cell includes a first positive electrode where the first electroactive material and/or a second positive electrode with a second electroactive material that are independently selected from the group consisting of: $LiNiMnCoO_2$, $Li(Ni_xMn_yCo_z)O_2$, where $0 \le x \le 1$, $0 \le y \le 1$, $0 \le z \le 1$, and $x+y+z=1$, $LiNiCoAlO_2$, $LiNi_{1-x-y}Co_xAl_yO_2$ (where $0 \le x \le 1$ and $0 \le y \le 1$), $LiNi_xMn_{1-x}O_2$ (where $0 \le x \le 1$), $LiMn_2O_4$, $Li_{1+x}MO_2$ (where M is one of Mn, Ni, Co, Al and $0 \le x \le 1$), $LiMn_2O_4$ (LMO), $LiNi_xMn_{1.5}O_4$, $LiV_2(PO_4)_3$, $LiFeSiO_4$, $LiMPO_4$ (where M is at least one of Fe, Ni, Co, and Mn), certain carbonaceous materials, such as activated carbon, and combinations thereof.

Such active materials may be intermingled with an optional electrically conductive material (e.g., particles) and at least one polymeric binder, for example, by slurry casting active materials and optional conductive material particles with such binders, like polyvinylidene fluoride (PVdF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene difluoride (PVdF), lithium polyacrylate (LiPAA), sodium polyacrylate (NaPAA), sodium alginate, lithium alginate, and combinations thereof.

In certain variations, a high-power capacity electroactive material may be in one of the positive electrodes and may comprise an active material, such as carbon-containing compounds, such as disordered carbons and graphitic carbons/graphite, porous carbon materials that include activated carbons (AC), carbon xerogels, carbon nanotubes (CNTs), mesoporous carbons, templated carbons, carbide-derived carbons (CDCs), graphene, porous carbon spheres, and heteroatom-doped carbon materials. Faradaic capacitor materials may also be included, such as noble metal oxides, e.g., $RuO_2$, transition metal oxides or hydroxides, such as $MnO_2$, NiO, $Co_3O_4$, $Co(OH)_2$, $Ni(OH)_2$, and the like. Capacitance delivered by Faradaic capacitor materials is called pseudo-capacitance, which are intrinsically fast and reversible redox reactions. Other capacitor active materials may include conducting polymers, such as polyaniline (PANI), polythiophene (PTh), polyacetylene, polypyrrole (PPy), and the like. In yet other aspects, the high-power capacity electroactive material may be silicon, silicon-containing alloys, tin-containing alloys, a lithium titanate compound selected from the group consisting of: $Li_{4+x}Ti_5O_{12}$, where $0 \leq x \leq 3$, including lithium titanate ($Li_4Ti_5O_{12}$) (LTO), $Li_{4-x^a/3}Ti_{5-2x^a/3}Cr_{x^a}O_{12}$, where $0 \leq x^a \leq 1$, $Li_4Ti_{5-x}{}^bSc_x{}^bO_{12}$, where $0 \leq x^b \leq 1$, $Li_{4-x}{}^cZn_x{}^cTi_5O_{12}$, where $0 \leq x^c \leq 1$, $Li_4TiNb_2O_7$, and combinations thereof.

In certain variations, the high-power capacity electroactive material may comprise an electroactive material selected from the group consisting of: activated carbon, hard carbon, soft carbon, porous carbon materials, graphite, graphene, carbon nanotubes, carbon xerogels, mesoporous carbons, templated carbons, carbide-derived carbons (CDCs), graphene, porous carbon spheres, heteroatom-doped carbon materials, metal oxides of noble metals, such as $RuO_2$, transition metals, hydroxides of transition metals, $MnO_2$, NiO, $Co_3O_4$, $Co(OH)_2$, $Ni(OH)_2$, polyaniline (PANI), polythiophene (PTh), polyacetylene, polypyrrole (PPy), and the like.

Electrically conductive materials may include graphite, other carbon-based materials, conductive metals or conductive polymer particles. Carbon-based materials may include by way of non-limiting example, particles of KETCHEN™ black, DENKA' black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. Carbon nanotubes and carbon nanofibers may also be used. In certain aspects, mixtures of electrically conductive materials may be used.

A positive current collector may be formed from aluminum or any other appropriate electrically conductive material known to those of skill in the art. As noted above, the positive current collector may be coated on one or more sides.

In various aspects, the negative electrode includes an electroactive material as a lithium host material capable of functioning as a negative terminal of a lithium-ion battery. The negative electrode may thus include the electroactive lithium host material and optionally another electrically conductive material, as well as one or more polymeric binder materials to structurally hold the lithium host material together.

For example, in one embodiment, the negative electrode may include an electroactive material including carbon-containing compounds, like graphite, silicon oxide activated carbon (AC), hard carbon (HC), soft carbon (SC), graphite, graphene, carbon nanotubes, and the like. Graphite is a high-energy capacity negative electroactive material. Commercial forms of graphite and other graphene materials may be used as electroactive materials. Other materials include, for example, silicon (Si), tin (Sn), and lithium (Li), including lithium-silicon and silicon containing binary and ternary alloys and/or tin-containing alloys, such as Si—Sn, SiSnFe, SiSnAl, SiFeCo, $SnO_2$, and the like. Titanium dioxide ($TiO_2$) is also a suitable negative active material. In certain variations, the negative electroactive material may be a lithium titanate compound selected from the group consisting of: $Li_{4+x}Ti_5O_{12}$, where $0 \leq x \leq 3$, $Li_{4-xa/3}Ti_{5-2xa/3}Cr_{xa}O_{12}$, where $0 \leq xa \leq 1$, $Li_4Ti_{5-xb}Sc_{xb}O_{12}$, where $0 \leq xb \leq 1$, $Li_{4-xc}Zn_{xc}Ti_5O_{12}$, where $0 \leq xc \leq 1$, $Li_4TiNb_2O_7$, and combinations thereof. In certain variations, the high power capacity electroactive material comprises $Li_{4+x}Ti_5O_{12}$, where $0 \leq x \leq 3$, including lithium titanate ($Li_4Ti_5O_{12}$) (LTO). Lithium may be provided as an elemental metal or in alloyed form. Other suitable negative electroactive materials include ferrous sulfide (FeS), vanadium pentoxide ($V_2O_5$). titanium dioxide ($TiO_2$), iron (III) oxide ($Fe_2O_3$), iron (II) oxide ($Fe_3O_4$), iron (III) oxide-hydroxide (β-FeOOH), manganese oxide ($MnO_2$), niobium pentoxide ($Nb_2O_5$), ruthenium dioxide ($RuO_2$), and combinations thereof.

In certain aspects, the hybrid lithium-ion electrochemical cell may include a negative electrode having a negative electroactive material selected from the group consisting of: lithium metal, lithium alloy, silicon (Si), silicon alloy, silicon oxide activated carbon, hard carbon, soft carbon, graphite, graphene, carbon nanotubes, lithium titanium oxide ($Li_4Ti_5O_{12}$), tin (Sn), vanadium oxide ($V_2O_5$), titanium dioxide ($TiO_2$), titanium niobium oxide ($Ti_xNb_yO_z$ where $0 \leq x \leq 2$, $0 \leq y \leq 24$, and $0 \leq z \leq 64$), ferrous sulfide (FeS), and combinations thereof.

The negative electroactive materials may be intermingled with a binder material selected from the group consisting of: polyvinylidene difluoride (PVdF), poly(tetrafluoroethylene) (PTFE), ethylene propylene diene monomer (EPDM) rubber, or carboxymethoxyl cellulose (CMC), a nitrile butadiene rubber (NBR), styrene ethylene butylene styrene copolymer (SEBS), styrene butadiene styrene copolymer (SBS), lithium polyacrylate (LiPAA), sodium polyacrylate (Na-PAA), sodium alginate, lithium alginate, and combinations thereof, by way of non-limiting example.

Suitable additional electrically conductive particles may include a material selected from carbon-based materials, conductive metals, conductive polymers, and combinations thereof. Carbon-based materials may include by way of non-limiting example, carbon black, particles of KETCHEN' black, DENKA' black, acetylene black, graphite, graphene, graphene oxide, acetylene black, carbon nanofibers, carbon nanotubes, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of conductive particle materials may be used.

A negative electrode current collector may be a copper collector foil, which may be in the form of an open mesh grid or a thin film. The current collectors can be connected to an external current collector tab.

As discussed above, a battery may have a laminated cell structure, comprising an anode or negative electrode layer, a cathode or positive electrode layer, and electrolyte/separator disposed between the negative electrode and the positive electrode layers. The negative and positive current collectors may be coated with cathode and anode layers respectively on both sides (double-sided coating).

An electrode may be made by mixing the electrode active material into a slurry with a polymeric binder compound, a non-aqueous solvent, optionally a plasticizer, and optionally if necessary, electrically conductive particles. The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperatures to form self-supporting films. If the substrate is removable, it is then removed from the electrode film that is then further laminated to a current collector. With either type of substrate, it may be necessary to extract or remove the remaining plasticizer prior to incorporation into the battery cell.

Where a composite electrode is formed, including a polymeric binder matrix, there may be greater than or equal to about 50 wt. % to less than or equal to about 97 wt. % of negative electroactive materials in the electrode, optionally greater than or equal to about 0 wt. % to less than or equal to about 30 wt. % of one or more electrically conductive additives; and optionally greater than or equal to about 0 wt. % to less than or equal to about 20 wt. % of one or more binders.

Alternatively, active materials, such as lithium metal may be deposited, for example, via a coating formation process, such as in atomic layer deposition (ALD), or physical vapor deposition, or chemical vapor infiltration or joined as a preformed film with a current collector.

A single cell may thus be assembled in a laminated cell structure, comprising an anode layer, a cathode layer, and electrolyte/separator between the anode and cathode layers. Generally, an electrochemical cell can refer to a unit that can be connected to other units. A plurality of electrically connected cells, for example, those that are stacked together, may be considered to be a module. A pack generally refers to a plurality of operatively-connected modules, which may be electrically connected in various combinations of series or parallel connections. The battery module may thus be encased in a pouch structure, a housing, or located with a plurality of other battery modules to form a battery pack. In certain aspects, the battery module may be part of a prismatic hybrid cell battery.

In one example, a negative electrode layer having electrode active materials and optional electrically conductive particles dispersed in a polymeric binder matrix can be disposed over the negative current collector. A separator can then be positioned over the negative electrode element, which is covered with a positive electrode membrane comprising an electroactive material, optional electrically conductive particle, which are distributed in a polymeric binder matrix. A positive current collector, such as aluminum collector foil or grid completes the assembly. The negative and positive current collectors can be further coated on one or more sides, as discussed above. Tabs of the current collector elements may form respective terminals for the battery. In this manner, a plurality of cells can be formed to create a cell core comprising a stack of cells, jellyroll, or winding of distinct cells. A protective bagging material covers the cell(s) and prevents infiltration of air and moisture. Into this bag, a liquid electrolyte may be injected into the separator (and may be imbibed into the positive and/or negative electrodes) suitable for lithium ion transport. In certain aspects, the laminated battery is further hermetically sealed prior to use.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid lithium-ion electrochemical cell comprising:
a first electrode having a first polarity and that comprises a first electroactive material that reversibly cycles lithium ions;
a second electrode having the first polarity and that comprises a second electroactive material that reversibly cycles lithium ions distinct from the first electroactive material;
at least one third electrode comprising a third electroactive material that reversibly cycles lithium ions and having a second polarity opposite to the first polarity; and
at least one voltage modification component in electrical communication with the first electrode and the second electrode, wherein the hybrid lithium-ion electrochemical cell has a first operational state corresponding to charging and a second operational state corresponding to discharging, wherein the at least one voltage modification component is configured to induce a voltage drop in the first operational state.

2. The hybrid lithium-ion electrochemical cell of claim 1, wherein the at least one voltage modification component is selected from the group consisting of: a diode, a p-n junction diode, a Schottky diode, a triode, a transistor, a thyristor, a field effect transistor, an electronic device comprising a p-n-junction, and combinations thereof.

3. The hybrid lithium-ion electrochemical cell of claim 1, further comprising at least two voltage modification components in electrical connection with the first electrode and the second electrode, wherein a first voltage modification component is configured to induce a first voltage drop in the first or second operational state and a second voltage modification component is configured to permit current to pass in the other of the first or second operational state.

4. The hybrid lithium-ion electrochemical cell of claim 1, wherein the first electrode and the second electrode are connected either in parallel or in series.

5. The hybrid lithium-ion electrochemical cell of claim 1, wherein the at least one voltage modification component further comprises a plurality of voltage modification components connected in series, wherein the voltage drop is a cumulative voltage drop generated by the plurality of voltage modification components.

6. The hybrid lithium-ion electrochemical cell of claim 1, wherein the at least one voltage modification component further comprises a plurality of voltage modification components connected in parallel to lower resistance.

7. The hybrid lithium-ion electrochemical cell of claim 1, wherein the voltage drop is greater than 0 V and less than or equal to about 5 V.

8. The hybrid lithium-ion electrochemical cell of claim 1, wherein the first electrode is a first positive electrode and the second electrode is a second positive electrode, wherein the first electroactive material is selected from the group consisting of: $LiNiMnCoO_2$, $Li(Ni_xMn_yCo_z)O_2)$, where $0 \leq x \leq 1$, $0 \leq y \leq 1$, $0 \leq z \leq 1$, and $x+y+z=1$, $LiNiCoAlO_2$, $LiNi_{1-x-y}Co_xAl_yO_2$ (where $0 \leq x \leq 1$ and $0 \leq y \leq 1$), $LiNi_xMn_{1-x}O_2$ (where $0 \leq x \leq 1$), $LiMn_2O_4$, $Li_{1+x}MO_2$ (where M is one of Mn, Ni, Co, Al and $0 \leq x \leq 1$), $LiMn_2O_4$ (LMO), $LiNi_xMn_{1.5}O_4$, $LiV_2(PO_4)_3$, $LiFeSiO_4$, $LiMPO_4$ (where M is at least one of Fe, Ni, Co, and Mn), activated carbon, and combinations thereof.

9. The hybrid lithium-ion electrochemical cell of claim 8, wherein the at least one third electrode is a negative electrode and the third electroactive material is selected from the group consisting of: lithium metal, lithium alloy, silicon (Si), silicon alloy, silicon oxide activated carbon, hard carbon, soft carbon, graphite, graphene, carbon nanotubes, lithium titanium oxide ($Li_4Ti_5O_{12}$), tin (Sn), vanadium oxide ($V_2O_5$), titanium dioxide ($TiO_2$), titanium niobium oxide ($Ti_xNb_yO_z$ where $0 \leq x \leq 2$, $0 \leq y \leq 24$, and $0 \leq z \leq 64$), ferrous sulfide (FeS), and combinations thereof.

10. The hybrid lithium-ion electrochemical cell of claim 1, wherein the second electroactive material is selected from the group consisting of: silicon oxide activated carbon, hard carbon, soft carbon, porous carbon materials, graphite, graphene, carbon nanotubes, carbon xerogels, mesoporous carbons, templated carbons, carbide-derived carbons (CDCs), graphene, porous carbon spheres, heteroatom-doped carbon materials, metal oxides of noble metals, $RuO_2$, transition metals, hydroxides of transition metals, $MnO_2$, NiO, $Co_3O_4$, $Co(OH)_2$, $Ni(OH)_2$, polyaniline (PANI), polypyrrole (PPy), polythiophene (PTh), and combinations thereof.

11. The hybrid lithium-ion electrochemical cell of claim 1, wherein the first electroactive material has a first electrochemical potential, the second electroactive material has a second electrochemical potential, wherein a difference between the second electrochemical potential and the first electrochemical potential defines a first predetermined voltage difference, wherein the voltage drop corresponds to the predetermined voltage difference.

12. The hybrid lithium-ion electrochemical cell of claim 1, wherein the first electrode is a first negative electrode and the second electrode is a second negative electrode, wherein the first electroactive material is selected from the group consisting of: lithium metal, lithium alloy, silicon (Si), silicon alloy, silicon oxide activated carbon, hard carbon, soft carbon, graphite, graphene, carbon nanotubes, lithium titanium oxide ($Li_4Ti_5O_{12}$), tin (Sn), vanadium oxide ($V_2O_5$), titanium dioxide ($TiO_2$), titanium niobium oxide ($Ti_xNb_yO_z$ where $0 \leq x \leq 2$, $0 \leq y \leq 24$, and $0 \leq z \leq 64$), ferrous sulfide (FeS), and combinations thereof and the second electroactive material is selected from the group consisting of: silicon oxide activated carbon, hard carbon, soft carbon, porous carbon materials, graphite, graphene, carbon nanotubes, carbon xerogels, mesoporous carbons, templated carbons, carbide-derived carbons (CDCs), graphene, porous carbon spheres, heteroatom-doped carbon materials, metal oxides of noble metals, $RuO_2$, transition metals, hydroxides of transition metals, $MnO_2$, NiO, $Co_3O_4$, $Co(OH)_2$, $Ni(OH)_2$, polyaniline (PANI), polypyrrole (PPy), polythiophene (PTh), and combinations thereof.

13. The hybrid lithium-ion electrochemical cell of claim 12, wherein the third electrode is a positive electrode and the third electroactive material is selected from the group consisting of: $LiNiMnCoO_2$, $Li(Ni_xMn_yCo_z)O_2$), where $0 \leq x \leq 1$, $0 \leq y \leq 1$, $0 \leq z \leq 1$, and $x+y+z=1$, $LiNiCoAlO_2$, $LiNi_{1-x-y}Co_xAl_yO_2$ (where $0 \leq x \leq 1$ and $0 \leq y \leq 1$), $LiNi_xMn_{1-x}O_2$ (where $0 \leq x \leq 1$), $LiMn_2O_4$, $Li_{1+x}MO_2$ (where M is one of Mn, Ni, Co, Al and $0 \leq x \leq 1$), $LiMn_2O_4$ (LMO), $LiNi_xMn_{1.5}O_4$, $LiV_2(PO_4)_3$, $LiFeSiO_4$, $LiMPO_4$ (where M is at least one of Fe, Ni, Co, and Mn), activated carbon, and combinations thereof.

14. An electrochemical device comprising:
a plurality of electrochemical cells that comprise:
at least one first electrode having a first polarity and that comprises a first electroactive material that reversibly cycles lithium ions;
at least one second electrode having the first polarity and that comprises a second electroactive material that reversibly cycles lithium ions and is distinct from the first electroactive material;
at least one third electrode comprising a third electroactive material that reversibly cycles lithium ions having a second polarity opposite to the first polarity; and
at least two diodes in electrical communication with the first electrode and the second electrode, wherein the electrochemical device has a first operational state corresponding to charging and a second operational state corresponding to discharging, wherein a first of the at least two diodes is configured to induce a first voltage drop in the first operational state and a second of the at least two diodes is configured to permit current to flow in the second operational state; and
a housing that encases the plurality of electrochemical cells.

15. The electrochemical device of claim 14, wherein the plurality of electrochemical cells either define:
(i) a stack and the at least two diodes are disposed inside the stack; or
(ii) a stack or a cell core and the at least two diodes are disposed external to the stack or the cell core, but inside the housing.

16. The electrochemical device of claim 14, wherein the first electrode and the second electrode are connected either in parallel or in series.

17. The electrochemical device of claim 14, wherein the first electrode is a first positive electrode and the second electrode is a second positive electrode, wherein the first electroactive material is selected from the group consisting of: $LiNiMnCoO_2$, $Li(Ni_xMn_yCo_z)O_2$), where $0 \leq x \leq 1$, $0 \leq y \leq 1$, $0 \leq z \leq 1$, and $x+y+z=1$, $LiNiCoAlO_2$, $LiNi_{1-x-y}Co_xAl_yO_2$ (where $0 \leq x \leq 1$ and $0 \leq y \leq 1$), $LiNi_xMn_{1-x}O_2$ (where $0 \leq x \leq 1$), $LiMn_2O_4$, $Li_{1+x}MO_2$ (where M is one of Mn, Ni, Co, Al and $0 \leq x \leq 1$), $LiMn_2O_4$ (LMO), $LiNi_xMn_{1.5}O_4$, $LiV_2(PO_4)_3$, $LiFeSiO_4$, $LiMPO_4$ (where M is at least one of Fe, Ni, Co, and Mn), activated carbon, and combinations thereof.

18. The electrochemical device of claim 14, wherein the first electrode is a first negative electrode and the second electrode is a second negative electrode, wherein the first electroactive material and the second electroactive material are independently selected from the group consisting of: lithium metal, lithium alloy, silicon (Si), silicon alloy, silicon oxide activated carbon, hard carbon, soft carbon, graphite, graphene, carbon nanotubes, lithium titanium oxide ($Li_4Ti_5O_{12}$), tin (Sn), vanadium oxide ($V_2O_5$), titanium dioxide ($TiO_2$), titanium niobium oxide ($Ti_xNb_yO_z$ where $0 \leq x \leq 2$, $0 \leq y \leq 24$, and $0 \leq z \leq 64$), ferrous sulfide (FeS), and combinations thereof.

19. An electrochemical device comprising:
a first cell core that comprises:
at least one first electrode having a first polarity and that comprises a first electroactive material that reversibly cycles lithium ions;
a first electrical terminal connected to the at least one first electrode;
at least one second electrode comprising a second electroactive material that reversibly cycles lithium ions having a second polarity opposite to the first polarity; and
a second electrical terminal connected to the at least one second electrode;

a second cell core that comprises:
- at least one third electrode having the first polarity and that comprises a third electroactive material that reversibly cycles lithium ions;
- a third electrical terminal connected to the at least one third electrode;
- at least one fourth electrode having the second polarity and comprising a fourth electroactive material; and
- a fourth electrical terminal connected to the at least one fourth electrode, wherein the first electrical terminal and the third electrical terminal are electrically connected and the second electrical terminal and the fourth electrical terminal are electrically connected; and
- at least two voltage modification components in electrical communication with the first electrical terminal and the third electrical terminal, wherein the electrochemical device has a first operational state corresponding to charging and a second operational state corresponding to discharging, wherein a first of the at least two voltage modification components is configured to induce a voltage drop in the first operational state and a second of the voltage modification components is configured to permit current to flow in the second operational state.

20. The electrochemical device of claim 19, wherein the second electroactive material and the fourth electroactive material are distinct, wherein the electrochemical device further comprises:
- a third voltage modification component and a fourth voltage modification component in electrical communication with the second electrical terminal and the fourth electrical terminal, the third voltage modification component is configured to induce a voltage drop in the other of the first or second operational states and the fourth voltage modification component is configured to permit current to flow in the one of the first or second operational states.

* * * * *